United States Patent
Bloms et al.

(10) Patent No.: US 12,495,974 B2
(45) Date of Patent: Dec. 16, 2025

(54) SYSTEMS AND METHODS FOR VASCULAR IMAGE CO-REGISTRATION

(71) Applicant: Boston Scientific Scimed, Inc., Maple Grove, MN (US)

(72) Inventors: Kevin Bloms, Minneapolis, MN (US); Wenguang Li, Los Gatos, CA (US); Hatice Cinar Akakin, Eden Prairie, MN (US); Alexander Shang, Minneapolis, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 189 days.

(21) Appl. No.: 18/091,772

(22) Filed: Dec. 30, 2022

(65) Prior Publication Data

US 2023/0210381 A1 Jul. 6, 2023

Related U.S. Application Data

(60) Provisional application No. 63/298,801, filed on Jan. 12, 2022, provisional application No. 63/295,722, filed on Dec. 31, 2021.

(51) Int. Cl.
*A61B 5/02* (2006.01)
*A61B 5/00* (2006.01)
(Continued)

(52) U.S. Cl.
CPC ........ *A61B 5/02028* (2013.01); *A61B 5/7267* (2013.01); *A61B 8/0891* (2013.01);
(Continued)

(58) Field of Classification Search
CPC . A61B 5/02028; A61B 5/7267; A61B 5/0066; A61B 5/0084; A61B 5/0215;
(Continued)

(56) References Cited

U.S. PATENT DOCUMENTS 6,004,271 A 12/1999 Moore
6,148,095 A 11/2000 Prause et al.
(Continued)

FOREIGN PATENT DOCUMENTS

GB 2573463 A 11/2019
WO 9956627 A1 11/1999
(Continued)

OTHER PUBLICATIONS

Kim, Geena, et al. "Prediction of FFR from IVUS images using machine learning." Intravascular Imaging and Computer Assisted Stenting and Large-Scale Annotation of Biomedical Data and Expert Label Synthesis: Labels 2018 (Year: 2018).*
(Continued)

*Primary Examiner* — Sean D Mattson
(74) *Attorney, Agent, or Firm* — Seager, Tufte & Wickhem, LLP

(57) ABSTRACT

A neural network is trained for estimating patient hemodynamic data using a plurality of extravascular imaging data sets and a plurality of intravascular imaging data sets that are each co-registered to a corresponding extravascular imaging data set. A plurality of hemodynamic data sets are provided, each hemodynamic data set co-registered with the corresponding extravascular imaging data set. The neural network learns what hemodynamic data to expect for a given intravascular imaging data set. An intravascular imaging event is subsequently performed in which an intravascular imaging element is translated within a blood vessel of the patient to produce one or more intravascular images. The neural network uses its training to predict hemodynamic values corresponding to the one or more intravascular images from the intravascular imaging event, and the one or more intravascular images are outputted in combination with the predicted hemodynamic values.

12 Claims, 13 Drawing Sheets

(51) Int. Cl.
*A61B 8/08* (2006.01)
*G06N 3/08* (2023.01)
(52) U.S. Cl.
CPC .............. *A61B 5/0066* (2013.01); *G06N 3/08* (2013.01); *G06T 2207/30101* (2013.01)
(58) Field of Classification Search
CPC ......... A61B 6/5217; A61B 6/507; A61B 8/12; A61B 8/5223; A61B 8/0891; G06N 3/08; G06T 2207/30101; G16H 30/40; G16H 50/20
See application file for complete search history.

(56) References Cited

U.S. PATENT DOCUMENTS

| | | | |
|---|---|---|---|
| 6,292,681 | B1 | 9/2001 | Moore |
| 6,945,938 | B2 | 9/2005 | Grunwald |
| 6,966,891 | B2 | 11/2005 | Ookubo et al. |
| 7,306,561 | B2 | 12/2007 | Sathyanarayana |
| 7,460,716 | B2 | 12/2008 | Sathyanarayana |
| 7,623,900 | B2 | 11/2009 | Graham et al. |
| 7,625,367 | B2 | 12/2009 | Adams et al. |
| 7,666,143 | B2 | 2/2010 | Wilser et al. |
| 7,680,307 | B2 | 3/2010 | Sathyanarayana |
| 7,729,533 | B2 | 6/2010 | Sathyanarayana |
| 8,062,226 | B2 | 11/2011 | Moore |
| 8,114,032 | B2 | 2/2012 | Ferry et al. |
| 8,317,711 | B2 | 11/2012 | Dala-Krishna |
| 8,323,203 | B2 | 12/2012 | Thornton |
| 8,403,856 | B2 | 3/2013 | Corl |
| 9,084,575 | B2 | 7/2015 | Moore et al. |
| 9,839,410 | B2 | 12/2017 | Courtney et al. |
| 9,872,665 | B2 | 1/2018 | Okubo et al. |
| 9,895,163 | B2 | 2/2018 | Trovato |
| 9,931,101 | B2 | 4/2018 | Okubo et al. |
| 10,039,522 | B2 | 8/2018 | Magnin et al. |
| 10,052,082 | B2 | 8/2018 | Hossack et al. |
| 10,076,272 | B2 | 9/2018 | Devgon et al. |
| 10,130,337 | B2 | 11/2018 | Okubo et al. |
| 10,130,427 | B2 | 11/2018 | Tanner et al. |
| 10,143,411 | B2 | 12/2018 | Cabot |
| 10,204,718 | B2 | 2/2019 | Williams et al. |
| 10,249,048 | B1* | 4/2019 | Wang ................ A61B 5/02028 |
| 10,420,456 | B2 | 9/2019 | Zelenka et al. |
| 10,420,530 | B2 | 9/2019 | Hancock et al. |
| 10,448,922 | B2 | 10/2019 | Van Hoven et al. |
| 10,485,608 | B2 | 11/2019 | Moisa et al. |
| 10,492,757 | B2 | 12/2019 | Sakaguchi |
| 10,555,780 | B2 | 2/2020 | Tanner et al. |
| 10,575,819 | B2 | 3/2020 | Davies et al. |
| 10,758,207 | B2 | 9/2020 | Park et al. |
| 10,779,796 | B2 | 9/2020 | Hiltner et al. |
| 10,905,851 | B2 | 2/2021 | Zelenka et al. |
| 10,932,752 | B2 | 3/2021 | Sakaguchi |
| 10,993,694 | B2 | 5/2021 | Meyer et al. |
| 11,076,829 | B2 | 8/2021 | Okubo et al. |
| 11,213,356 | B2 | 1/2022 | Tanner et al. |
| 2002/0049375 | A1 | 4/2002 | Strommer et al. |
| 2003/0097072 | A1 | 5/2003 | Serrano et al. |
| 2004/0066958 | A1 | 4/2004 | Chen et al. |
| 2005/0124857 | A1 | 6/2005 | Adams et al. |
| 2005/0249391 | A1 | 11/2005 | Kimmel et al. |
| 2006/0036167 | A1 | 2/2006 | Shina |
| 2006/0100502 | A1 | 5/2006 | Chen et al. |
| 2006/0100522 | A1 | 5/2006 | Yuan et al. |
| 2006/0106320 | A1 | 5/2006 | Barbato |
| 2006/0173350 | A1 | 8/2006 | Yuan et al. |
| 2006/0241465 | A1* | 10/2006 | Huennekens ............ A61B 5/06 600/458 |
| 2006/0253028 | A1 | 11/2006 | Lam et al. |
| 2007/0016054 | A1 | 1/2007 | Cao et al. |
| 2007/0038111 | A1 | 2/2007 | Rehrig et al. |
| 2007/0287914 | A1 | 12/2007 | Cohen |
| 2008/0004530 | A1 | 1/2008 | Feldman et al. |
| 2008/0101674 | A1 | 5/2008 | Begelman et al. |
| 2009/0060298 | A1 | 3/2009 | Weijers et al. |
| 2009/0103794 | A1 | 4/2009 | Sathyanarayana |
| 2009/0148024 | A1 | 6/2009 | Park |
| 2009/0156941 | A1 | 6/2009 | Moore |
| 2009/0270731 | A1 | 10/2009 | Sathyanarayana |
| 2009/0270737 | A1 | 10/2009 | Thornton |
| 2010/0022880 | A1 | 1/2010 | Sathyanarayana et al. |
| 2010/0061601 | A1 | 3/2010 | Abramoff et al. |
| 2011/0096972 | A1 | 4/2011 | Gatta et al. |
| 2011/0280366 | A1 | 11/2011 | Maeda et al. |
| 2012/0059241 | A1 | 3/2012 | Hastings et al. |
| 2012/0059248 | A1 | 3/2012 | Holsing et al. |
| 2014/0180127 | A1 | 6/2014 | Meyer et al. |
| 2014/0254900 | A1 | 9/2014 | Sturm |
| 2015/0112182 | A1* | 4/2015 | Sharma ................ A61B 5/0261 600/408 |
| 2015/0196250 | A1 | 7/2015 | Nair et al. |
| 2016/0148372 | A1* | 5/2016 | Itu .......................... A61B 6/507 382/128 |
| 2016/0157808 | A1* | 6/2016 | Merritt ................... A61B 6/504 600/407 |
| 2016/0269195 | A1 | 9/2016 | Coenen et al. |
| 2017/0164925 | A1 | 6/2017 | Marshall et al. |
| 2018/0310888 | A1* | 11/2018 | Itu .......................... G16H 50/50 |
| 2018/0368934 | A1 | 12/2018 | Van Der Linde et al. |
| 2019/0076105 | A1* | 3/2019 | Haase ..................... A61B 6/507 |
| 2019/0076196 | A1* | 3/2019 | Haase ................... A61B 8/0891 |
| 2019/0357879 | A1 | 11/2019 | Corl |
| 2020/0086086 | A1 | 3/2020 | Barone et al. |
| 2020/0100764 | A1 | 4/2020 | Sakaguchi |
| 2020/0129149 | A1 | 4/2020 | Tokida et al. |
| 2020/0160509 | A1 | 5/2020 | Pack et al. |
| 2020/0187904 | A1 | 6/2020 | Davies et al. |
| 2020/0275909 | A1 | 9/2020 | Mniece et al. |
| 2020/0315584 | A1 | 10/2020 | Wissel et al. |
| 2021/0077037 | A1 | 3/2021 | Kunio et al. |
| 2021/0128109 | A1 | 5/2021 | Groenland et al. |
| 2021/0298718 | A1 | 9/2021 | Saroha et al. |
| 2021/0338199 | A1 | 11/2021 | Sakaguchi |
| 2022/0015740 | A1 | 1/2022 | Sakaguchi |
| 2023/0181140 | A1* | 6/2023 | Cohen ...................... A61B 6/12 600/424 |
| 2024/0164656 | A1* | 5/2024 | Steinberg ............... A61B 5/061 |
| 2024/0320831 | A1* | 9/2024 | Li .......................... A61B 6/032 |

FOREIGN PATENT DOCUMENTS

| | | |
|---|---|---|
| WO | 2005056096 A1 | 6/2005 |
| WO | 2007002685 A2 | 1/2007 |
| WO | 2008111070 A2 | 9/2008 |
| WO | 2009079569 A2 | 6/2009 |
| WO | 2009108863 A1 | 9/2009 |
| WO | 2011046425 A2 | 4/2011 |
| WO | 2013062011 A1 | 5/2013 |
| WO | 2014100606 A1 | 6/2014 |
| WO | 2016187231 A1 | 11/2016 |
| WO | 2021055837 A1 | 3/2021 |
| WO | 2021213927 A1 | 10/2021 |

OTHER PUBLICATIONS

Costa et al., Bifurcation Lesion Morphology and Intravascular Ultrasound Assessment, vol. 27, No. 2, pp. 189-196, 2011.
Davies et al., "Plaque Fissuring—The Cause of Acute Myocardial Infarction, Sudden Ischaemic Death and Crescendo Angina," British Heart Journal, vol. 53, pp. 363-373, 1985.
Demsar, "Statistical Comparisons of Classifiers over Multiple Data Sets," Journal of Machine Learning Research, vol. 7, pp. 1-30, 2006.
Diettrich, "Machine Learning for Sequential Data: A Review, Structural, Syntactic, and Statistical Pattern Recognition," Springer-Verlag, pp. 15-30, 2002.
Freund et al., "A Decision-Theoretic Generalization of On-Line Learning and an Appreciation to Boosting," Journal of Computer and System Sciences, vol. 55, No. 1, pp. 119-139, 1997.

(56) References Cited

OTHER PUBLICATIONS

Fuster et al., "Atherothrombosis and High-Risk Plaque: Part 1: Evolving Concepts," Journal of the American College of Cardiology, vol. 46, No. 6, pp. 937-954, 2005.
Kimura et al., "Atheroma Morphology and Distribution in Proximal Left Anterior Descending Coronary Artery; In Vivo Observations," Journal of the American College of Cardiology, vol. 27, No. 4, pp. 825-831, Mar. 15, 1996.
Loy et al., "Fast Radial Symmetry for Detecting Points of Interest," IEEE Transactions on Pattern Analysis and Machine Intelligence, vol. 25, No. 8, pp. 959-973, Aug. 2004.
Moore Jr. et al., "Coronary Artery Bifurcation Biomechanics and Implications for Interventional Strategies," Catheterization and Cardiovascular Interventions, vol. 76, pp. 836-843, 2010.
O'Malley et al., "Image Based Gating of Intravascular Ultrasound Pull-Back Sequences," IEEE Transaction on Information Technology in Biomedicine, vol. 12, No. 3, pp. 299-306, May 2008.
O'Malley et al., "One-Class Acoustic Characterization Applied to Blood Detections in IVUS," Proceedings of the 10th International Conference on Medical Image Computing and Computer-Assisted Interventions, vol. 1, Berlin, Heidelberg, Springer-Verlag, pp. 202-209, 2007.
Puertas et al; "Multi-Class Multi-Scale Stacked Sequential Learning," Proceedings of the 8th International Workshop on Multiple Classifier Systems, MSC '09, Berlin, Heidelberg, Springer-Verlag, pp. 262-271, 2009.
Boston Scientific, Hubble Design Change Overview, New Telescope Concept, Powerpoint Presentation, 6 pages, Jan. 14, 2022.
Wang et al; "A Micromotor Catheter for Intravascular Optical Coherence Tomograpy," Engineering, vol. 1, Issue 1, pp. 15-17, 2015.
Breiman et al., "Random Forests," Machine Learning, vol. 45, pp. 5-32, Oct. 2001. aaa.
Grissan et al., "A New Tracking System for the Robust Extraction of Retinal Vessel Structure," Proceedings of the 26th Annual International Conference of the IEEE EMBS, pp. 1620-1623, Sep. 2004.
Pujol et al., "Near Real-Time Plaque Segmentation of IVUS," Computers in Cardiology, vol. 30, pp. 69-72, 2003.
Rifkin et al., "In Defense of One-vs-All Classification," Journal of Machine Learning Research, vol. 5, pp. 101-141, 2004.
Rotger et al., "Blood Detection in IVUS Images for 3D Volume of Lumen Changes Measurement Due to Different Drugs Administration," Proceedings of the 12th International Conference on Computer Analysis of Images and Patterns, Berlin, Deidelberg, Springer-Verlag, pp. 285-292, 2007.
Shah "Mechanisms of Plaque Vulnerability and Rupture," Journal of the American College of Cardiology, vol. 41, No. 4, Supplement S, pp. 15S-22S, Feb. 2003.
Tanabe et al., "Restenosis Rates Following Bifurcation Stenting with Sirolimus-Eluting Stents for De Novo Narrowings," American Journal of Cardiology, vol. 91, pp. 115-118, 2004.
Treece et al., "Grey-Scale Gating for Freehand 3D Ultrasound," Proceedings of IEEE International Symposium on Biomedical Imaging, pp. 993-996, 2002.
Zhu et al., "Retrieval of Cardiac Phrase from IVUS Sequences," Proceedings of SPIE Medical Imaging, pp. 135-146, 2003.
Alberti et al., "Automatic Bifurcation Detection in Coronary IVUS Sequences," IEEE Transactions on Biomedical Engineering, vol. PP, No. 99,16 pages, 2010.
Ciompi et al., "A Meta-Learning Approach to Conditional Random Fields using Error-Correcting Output Codes," IEEE International Conference on Pattern Recognition (ICPR), 4 pages, 2010.
Wahle et al., "Determination of the Absolute Axial Orientation of Intracoronary Ultrasound Images in Fusion with Biplane Angiography," Computers in Cardiology, vol. 25, pp. 153-156, 1998.
International Search Report and Written Opinion of the International Patent Application No. PCT/US2011/053116 dated Mar. 9, 2012.

Cortes et al., "Support-Vector Networks," Machine Learning, vol. 20, pp. 273-297, 1995.
Lemos et al., Unrestricted Utilization of Sirolimus-Eluting stents Compared with Conventional Bare Stent Implantation in the 'Real World,' Circulation, vol. 109, No. 2, pp. 190-195, Jan. 20, 2004.
Kim et al., "Long-Term Outcomes of Intravascular Ultrasound Guided Stenting in Coronary Bifurcation Lesions," American Journal of Cardiology, vol. 106, No. 5, pp. 612-618, 2010.
Van Der Waal et al., "Intravascular Ultrasound and 3D Angle Measurements of Coronary Bifurcations," Catheterization and Cardiovascular Interventions, vol. 73, No. 7, pp. 910-916, Jun. 1, 2009.
Columbo et al., "Randomized Study of the Crush Technique Versus Provisional Side-Branch Strenting in True Coronary Bifurcations: the CACTUS (Coronary Bifurcations: Application of the Crushing Technique using Sirolimus- Eluting Stents) Study," Circulation, vol. 119, No. 1, pp. 71-78, Jan. 6, 2009.
Steigen et al., "Randomized Study on Simple versus Complex Stenting of Coronary Artery Bifurcation Lesions: the Nordic Bifurcation Study," Circulation, vol. 114, No. 18, pp. 1955-1961, Oct. 31, 2006.
Dzavik et al., "Predictors of Long-Term Outcome after Crush Stenting of Coronary Bifurcation Lesions: Importance of the Bifurcation Angle," American Heart Journal, vol. 152, No. 4, pp. 762-769, Oct. 2006.
Rotger et al., "Active Vessel: A New Multimedia Workstation for Intravascular Ultrasound and Angiography Fusion," Computers in Cardiology, pp. 65-68, 2003.
Bourantas et al., "A Method for 3D Reconstruction of Coronary Arteries using Biplane Angiography and Intravascular Ultrasound Images," Computerized Medical Imaging and graphics, vol. 29, No. 8, pp. 597-606, Dec. 2005.
Gatta et al., "Real-Time Gating of IVUS Sequences Based on Motion Blur Analysis: Method and Quantitative Validation," Proceedings of the 13th International Conference on Medical Image Computing and Computer Assisted Intervention, vol. 2, pp. 59-67, 2010.
Ciompi et al., "ECOC Random Fields for Lumen Segmentation in Radial Artery IVUS Sequences," Medical Image Computing and Computer-Assisted Intervention, vol. 12, Part 2, pp. 869-876, 2009.
Merle et al., "3D Reconstruction of the Deformable Coronary Tree Skeleton from Two X-Ray Angiographic Views," Computers in Cardiology, pp. 757-760, Sep. 1998.
Ardizzone et al., "Automatic Extraction of Blood Vessels, Bifurcation and End Points in the Retinal Vascular Tree," 13th International Conference on Biomedical Engineering, IFMBE Proceedings, Springer Berlin Heidelberg, pp. 22-26, 2009.
Rueckert et al., "Nonrigid Registration using Free-Form Deformations: Application to Breast MR Images," IEEE Transactions on Medical Imaging, vol. 19, No. 8, pp. 712-721, Aug. 1999.
Zarins et al., "Cartoid Bifurcation Atherosclerosis Quantitative Corrlation of Plaque Localization with Flow Velocity Profiles and Wall Shear Stress," Circulation Research, vol. 53, pp. 502-514, 1983.
Asakura et al., "Flow Patterns and Spatial Distribution of Atherosclerotic Lesions in Human Coronary Arteries," Circulation Research, vol. 66, pp. 1045-1066, Apr. 1990.
Katritsis et al., "Anatomic Characteristics of Culprit Sites in Acute Coronary Syndromes," Journal of Interventional Cardiology, vol. 21, No. 2, pp. 140-150, Apr. 2008.
Ciompi et al., "Reconstruction and Analysis of Intravascular Ultrasound Sequences," New Advances in Biomedical Signal Processing, Chapter 16, Bentham Science, pp. 231-250, 2011.
Wette et al., "Extending the Corkscrew Algorithm to Find Bifurcations of Vessels," Computer Graphics and Imaging, Innsbruck, Austria, 7 pages, 2010.
Zhou et al., "Vascular Structure Segmentation and Bifurcation Detection," International Symposium on Biomedical Imaging, pp. 872-875, Apr. 2007.
Koehler et al., "Extraction and Analysis of Coronary-Tree from Single X-Ray Angiographies," Medical Imaging, pp. 810-819, 2004.
Bhuiyan et al., "Automatic Detection of Vascular Bifurcations and Crossovers from Color Retinal Fundus Images," Proceedings of the

(56) References Cited

OTHER PUBLICATIONS 2007 3rd International IEEE Conference on Single-Image Technologies and Internet-Based System, pp. 662-669, Dec. 2007.

Zhang et al., "Tissue Characterization in Intravascular Ultrasound Images," IEEE Transaction on Medical Imaging, vol. 17, No. 6, pp. 889-899, Dec. 1998.

Pujol et al., "Intravascular Ultrasound Images Vessel Characterization using AdaBoost," Functional Imaging and Modelling of the Heart: Lecture Notes in Computer Science, pp. 242-251, 2003.

Caballero et al., "Using Reconstructed IVUS Images for Coronary Plaque Classification," Proceedings of the 29th Annual International Conference of the IEEE Engineering in Medicine and Biology Society, pp. 2167-2170, Aug. 2007.

Rotger et al., "Automatic Detection of Bioabsorbable Coronary Stents in IVUS Images using a Cascade of Classifiers," IEEE Transactions on Information Technology in Biomedicine, vol. 14, No. 2, pp. 535-537, Mar. 2010.

Gatta et al., "Robust Image-Based IVUS Pullbacks Gating," MICCAI '08: Proceedings of the 11th International Conference on Medical Image Computing and Computer-Assisted Intervention, Part II, Berlin, Heidelberg, Springer-Verlag, pp. 518-525, 2008.

Gatta et al., Fast Rigid Registration of Vascular Structures in IVUS Sequences, IEEE Transactions on Information Technology in Biomedicine, vol. 13, pp. 1006-1011, Nov. 2009.

Frame et al., "Structural Analysis of Retinal Vessels," 6th International Conference on Image Processing and its Applications, vol. 2, pp. 824-827, Jul. 1997.

Bovik et al., "Multichannel Texture Analysis using Localized Spatial Filters," IEEE Transactions on Pattern Analysis and Machine Intelligence, vol. 12, No. 1, pp. 55-73, Jan. 1990.

Ojala et al., "Multiresolution Gray-Scale and Rotation Invariant Texture Classification with Local Binary Patterns," IEEE Transactions on pattern Analysis and Machine Intelligence, vol. 24, No. 7, pp. 971-987, Jul. 2002.

Kudo et al., "In Vitro Study on Arterial Lumen Detection using a Correlation Technique in IVUS," Proceedings of the 20th Annual International Conference of the IEEE Engineering in Medicine and Biology Society, vol. 20, No. 2, pp. 830-831, Oct. 29, 1998.

Li et al., "Temporal Correlation of Blood Scattering Signals in Vivo from Radiofrequency Intravascular Ultrasound," Ultrasound in Medicine and Biology, vol. 22, No. 5, pp. 583-590, 1996.

Alberti et al., "Automatic Branching Detection in IVUS Sequences," Proceedings of the 5th Iberian Conference on Pattern Recognition and Image Analysis, No. 6669, Springer-Verlag, pp. 126-133, 2011.

Bruining et al., "Dynamic Three-Dimensional Reconstruction of ICUS images Based on ECG-Gated Pull-Back Device," 18th Annual International Conference of the IEEE Engineering in Medicine and Biology Society, pp. 633-635, 1996.

Ciompi et al., "Fusing In-Vitro and In-Vivo Intravascular Ultrasound Data for Plaque Characterization," International Journal of Cardiovascular Imaging, vol. 26, pp. 763-779, 2010.

Cohen, "Stacked Sequential Learning," International Joint Conference on Artificial Intelligence, pp. 671-676, 2005.

Columbo et al., "Randomized Study to Evaluate Sirolimus-Eluting Stents Implanted at Coronary Bifurcation Lesions," Circulation, vol. 109, pp. 1244-1249, 2004.

\* cited by examiner

SYSTEMS AND METHODS FOR VASCULAR IMAGE CO-REGISTRATION

CROSS-REFERENCE TO RELATED APPLICATIONS

This application claims the benefit of priority under 35 U.S.C. § 119 of U.S. Provisional Application No. 63/298,801, filed Jan. 12, 2022, and of U.S. Provisional Application No. 63/295,722, filed Dec. 31, 2021, the entire disclosures of which are hereby incorporated by reference.

TECHNICAL FIELD

The present disclosure pertains to medical imaging, and systems and methods for medical imaging. More particularly, the present disclosure pertains to systems and methods for vascular imaging including intravascular imaging and extravascular imaging and co-registration.

BACKGROUND

A wide variety of medical imaging systems and methods have been developed for medical use, for example, use in imaging vascular anatomy. Some of these systems and methods include intravascular imaging modalities and extravascular imaging modalities for imaging vasculature. These systems and methods include various configurations and may operate or be used according to any one of a variety of methods. Of the known vascular imaging systems and methods, each has certain advantages and disadvantages. Accordingly, there is an ongoing need to provide alternative systems and methods for vascular imaging and assessment, and co-registration of imaging.

SUMMARY

This disclosure provides alternative medical imaging systems and methods. An example includes a method for estimating patient hemodynamic data. The method includes training a neural network, followed by subsequently obtaining intravascular images for a patient and using the trained neural network in order to estimate the corresponding hemodynamic data. Training the neural network includes providing a plurality of extravascular imaging data sets to the neural network and providing a plurality of intravascular imaging data sets to the neural network, each intravascular imaging data set including intravascular imaging data showing a portion of a blood vessel from a starting location to an ending location, each intravascular imaging data set co-registered to a corresponding extravascular imaging data set of the plurality of extravascular imaging data sets. Training the neural network also includes providing a plurality of hemodynamic data sets to the neural network, each hemodynamic data set co-registered with the corresponding extravascular imaging data set of the plurality of extravascular imaging data sets. The neural network uses the provided plurality of intravascular imaging data sets and the provided plurality of hemodynamic data sets, each co-registered with the corresponding extravascular imaging data set to learn what hemodynamic data to expect for a given intravascular imaging data set, thereby creating a trained neural network. Using the trained neural network with a subsequent patient includes performing an intravascular imaging event in which an intravascular imaging element is translated within a blood vessel of the patient from a starting location to an ending location in order to produce one or more intravascular images. The trained neural network uses its training to predict hemodynamic values corresponding to the one or more intravascular images from the intravascular imaging event, and the one or more intravascular images are outputted in combination with the predicted hemodynamic values.

Alternatively or additionally, at least some of the plurality of intravascular imaging data sets provided while training the neural network may include intravascular ultrasound data.

Alternatively or additionally, at least some of the plurality of intravascular imaging data sets provided while training the neural network may include optical coherence tomography data.

Alternatively or additionally, at least some of the plurality of extravascular imaging data sets provided while training the neural network may include fluoroscopic image data.

Alternatively or additionally, at least some of the plurality of extravascular imaging data sets provided while training the neural network may include angiographic image data.

Alternatively or additionally, the angiographic data may include two-dimensional angiographic image data.

Alternatively or additionally, the angiographic data may include three-dimensional angiographic image data.

Alternatively or additionally, the angiographic data may include 3D CTA (three dimensional computed tomography angiography).

Alternatively or additionally, at least some of the plurality of hemodynamic data sets provided while training the neural network may include pressure data obtained by any hyperemic or non-hyperemic index.

Alternatively or additionally, at least some of the plurality of intravascular imaging data sets and at least some of the corresponding hemodynamic data sets may be co-registered using their corresponding points in 2D or 3D space on the corresponding extravascular imaging data set.

Alternatively or additionally, the neural network may include an ensemble of neural networks.

Alternatively or additionally, the neural network may include a CNN (convoluted neural network) with transformers.

Alternatively or additionally, the neural network may include a multi-layer neural network.

Alternatively or additionally, the multi-layer neural network may include a hemodynamic term within the loss function.

Alternatively or additionally, at least some of the plurality of intravascular imaging data sets provided while training the neural network may include quantitative data such as lumen borders, vessel borders, side-branch borders, blood speckle density and cardiac cycle parameters, and the quantitative data may be used in training the neural network.

Alternatively or additionally, the one or more intravascular images from the intravascular imaging event include an anatomical landmark, and the predicted hemodynamic values include a predicted pressure value proximate the anatomical landmark.

Alternatively or additionally, outputting the one or more intravascular images in combination with the predicted hemodynamic values may include displaying the one or more intravascular images and the predicted hemodynamic values on a graphical user interface of a signal processing unit.

Alternatively or additionally, displaying the one or more intravascular images and the predicted hemodynamic values on a graphical user interface of a signal processing unit may include displaying a fully co-registered display of the predicted hemodynamic values with the intravascular images.

Alternatively or additionally, displaying the one or more intravascular images and the predicted hemodynamic values on a graphical user interface of a signal processing unit may include displaying a fully tri-registered display of the predicted hemodynamic values with the intravascular images and a corresponding extravascular image.

Another example includes a method for processing imaging data. The method includes providing a plurality of intravascular imaging data sets to a neural network, wherein each intravascular imaging data set includes intravascular imaging data showing a portion of a blood vessel, co-registered to an extravascular image from a corresponding extravascular imaging data set, from a starting location to an ending location. A plurality of hemodynamic data sets are provided to the neural network, wherein each hemodynamic data set includes hemodynamic data from a corresponding portion of the blood vessel, co-registered to a corresponding extravascular image from the corresponding extravascular imaging data set, from a starting location to an ending location, as represented by one of the plurality of intravascular imaging data sets. The neural network uses the provided intravascular imaging data sets and the corresponding provided hemodynamic data sets, from co-registration of each data set to the same extravascular image, to learn what hemodynamic data to expect for a given intravascular imaging data set, thereby training the neural network. An intravascular imaging event in which an imaging element is translated within a blood vessel from a starting location to an ending location is performed in a new patient in order to produce one or more intravascular images. The neural network uses its training to predict hemodynamic values corresponding to the one or more intravascular images from the intravascular imaging event. The one or more intravascular images are outputted in combination with the predicted hemodynamic values.

Alternatively or additionally, at least some of the plurality of intravascular imaging data sets may include intravascular ultrasound data.

Alternatively or additionally, at least some of the plurality of intravascular imaging data sets may include optical coherence tomography data.

Alternatively or additionally, at least some of the plurality of extravascular imaging data sets may include fluoroscopic image data.

Alternatively or additionally, at least some of the plurality of extravascular imaging data sets may include angiographic image data.

Alternatively or additionally, at least some of the plurality of hemodynamic data sets may include pressure data obtained by any hyperemic or non-hyperemic index.

Another example includes a method for processing patient imaging data. The method includes obtaining intravascular imaging data from an intravascular imaging device including an imaging event during a translation procedure during which the imaging element is translated within a blood vessel from a starting location to an ending location, the intravascular imaging data including one or more intravascular images. The one or more intravascular images are inputted into a trained neural network in order to determine a predicted pressure reading for each of the one or more intravascular images. A series of pressure values within the blood vessel corresponding to an intravascular location of each of the one or more extravascular images are calculated, and a pressure ratio is calculated based on the series of pressure values.

Alternatively or additionally, the method may further include outputting the intravascular imaging data and the calculated pressure corresponding to a point within the blood vessel.

Alternatively or additionally, the method may further include obtaining extravascular imaging data including one or more extravascular images, and co-registering the intravascular imaging data with the extravascular imaging data in order to determine an intravascular location of each of the one or more extravascular images.

Alternatively or additionally, the method may further include outputting the co-registered extravascular imaging data in combination with the intravascular imaging data and the calculated pressure point corresponding to a point within the blood vessel.

Alternatively or additionally, obtaining extravascular imaging data may include obtaining extravascular imaging data corresponding to the blood vessel from the starting location to the ending location.

Alternatively or additionally, the intravascular imaging data may include intravascular ultrasound data.

Alternatively or additionally, the intravascular imaging data may include optical coherence tomography data.

Alternatively or additionally, the extravascular imaging data may include fluoroscopic image data.

Alternatively or additionally, the extravascular imaging data sets may include angiographic image data.

Another example includes a method for processing imaging data. The method includes encoding physical features from a plurality of IVUS frames produced during an IVUS pullback run. PRI (physiology resting index) pullback data is collected. Angiography imaging data is collected and is co-registered with the PRI pullback data. The IVUS frames are co-registered with the angiography imaging data in order to co-register the PRI pullback data with the IVUS frames. The co-registered IVUS frame, angiography imaging data and PM pullback data are used to train a neural network how to predict PRI data based on a subsequent IVUS pullback run. Subsequently, a new IVUS pullback run is executed in order to provide new IVUS pullback run data that includes a plurality of IVUs frame to the neural network so that the neural network can compute predicted PRI values for each IVUS frame.

Alternatively or additionally, the method may further include co-registering the new IVUS pullback run data with a corresponding angiography run.

The above summary of some embodiments is not intended to describe each disclosed embodiment or every implementation of the present disclosure. The Figures, and Detailed Description, which follow, more particularly exemplify these embodiments.

BRIEF DESCRIPTION OF THE DRAWINGS

The disclosure may be more completely understood in consideration of the following detailed description in connection with the accompanying drawings, in which.

Figure 1:
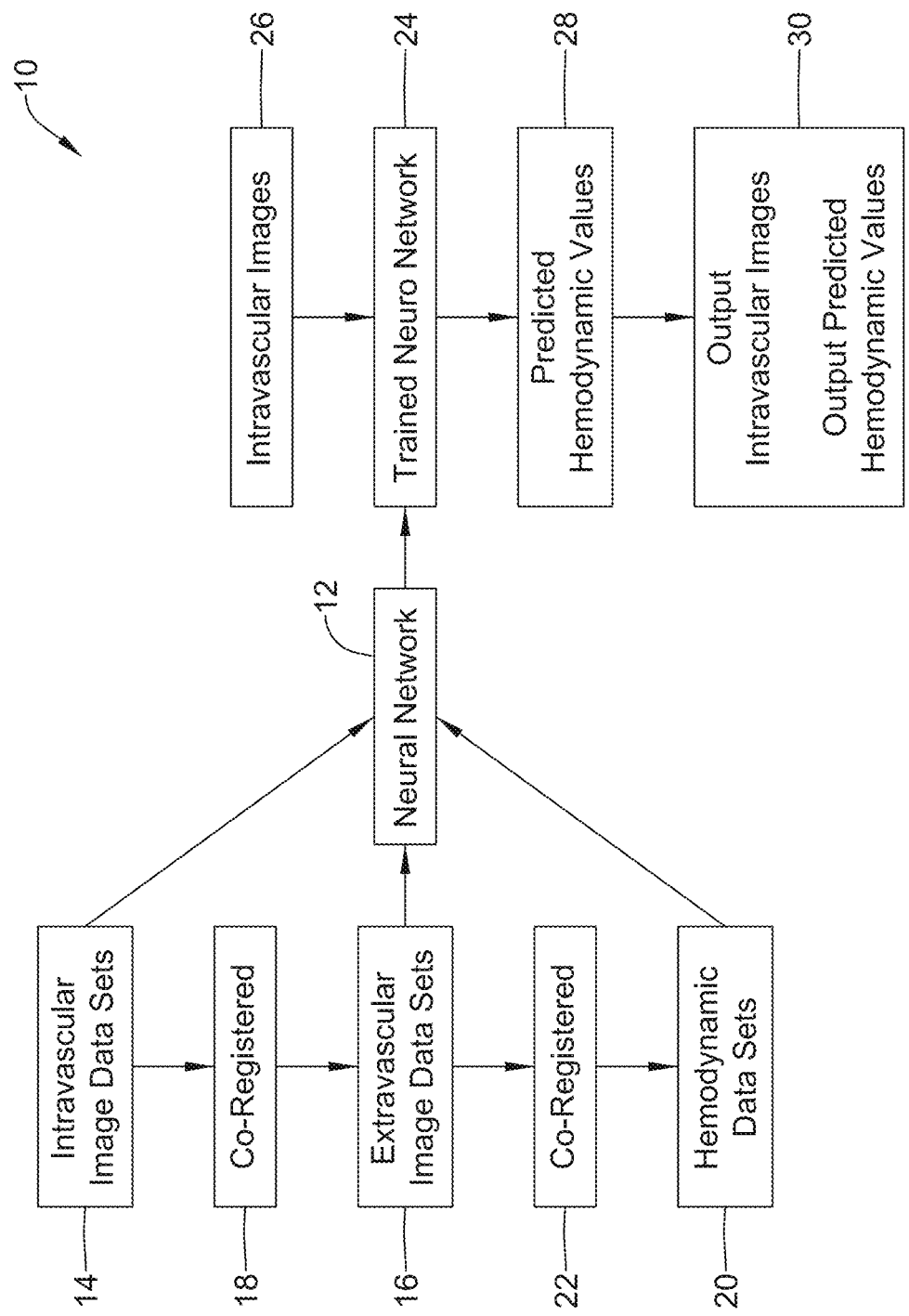
FIG. 1 is a schematic overview of training and using a neural network for predicting hemodynamic values based on intravascular imaging data.

While the disclosure is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "or" unless the content clearly dictates otherwise.

It is noted that references in the specification to "an embodiment", "some embodiments", "other embodiments", etc., indicate that the embodiment described may include one or more particular features, structures, or characteristics. However, such recitations do not necessarily mean that all embodiments include the particular features, structures, or characteristics. Additionally, when particular features, structures, or characteristics are described in connection with one embodiment, it should be understood that such features, structures, or characteristics may also be used connection with other embodiments whether or not explicitly described unless clearly stated to the contrary.

The following detailed description should be read with reference to the drawings in which similar elements in different drawings are numbered the same. The drawings, which are not necessarily to scale, depict illustrative embodiments and are not intended to limit the scope of the invention.

A number of different medical imaging modalities may be used to evaluate or treat blood vessels. Two general types of imaging modalities include extravascular imaging modalities and intravascular imaging modalities. This disclosure relates to the use and co-registration of these modalities.

Extravascular imaging modalities, such as various forms of radiological imaging, provide extravascular imaging data of a portion of a blood vessel. Some examples include angiography or fluoroscopy imaging modalities, such as two-dimensional angiography/fluoroscopy; three-dimensional angiography/fluoroscopy; or computer tomography angiography/fluoroscopy. Angiography typically involves rendering a radiological view of one or more blood vessels, often with the use of radiopaque contrast media. An angiographic image can also be viewed real time by fluoroscopy. In general, fluoroscopy uses less radiation than angiography, and is often used to guide medical devices including radiopaque markers within or through vessels. Extravascular imaging data of blood vessels may provide useful information about the blood vessel, the anatomy or the location or positioning of devices within the blood vessel or anatomy. For example, extravascular imaging data (e.g. angiograms) may provide a comprehensive overall image or series of images or a video of the blood vessel(s) of interest, and may provide a "roadmap" with a good temporal resolution for the general assessment of the blood vessel(s) or navigation of devices within blood vessels.

Intravascular imaging modalities provide intravascular imaging data of a portion of a blood vessel. Some examples of intravascular imaging modalities include intravascular ultrasound (IVUS) and optical coherence tomography (OCT). These modalities typically include imaging the vessel itself using a device-mounted intravascular probe including an imaging element disposed within the vessel. Several types of device systems have been designed to track through a vasculature to provide intravascular image data. These can include, but are not limited to, intravascular ultrasound (IVUS) devices and optical coherence tomography (OCT) devices (e.g. catheters, guidewires, etc). In operation, intravascular device-mounted probes including an imaging element are moved along a blood vessel in the region where imaging is desired. As the probe passes through an area of interest, sets of intravascular image data are obtained that correspond to a series of "slices" or cross-sections of the vessel, the lumen, and surrounding tissue. These devices may include radiopaque material or markers. Such markers are generally positioned near a distal tip or near or on the probe. Therefore, the approximate location of the imaging probe or imaging element can be discerned by observing the procedure on either a fluoroscope or an angiographic image or images. Typically, such imaging devices are connected to a dedicated processing unit or control module, including processing hardware and software, and a display. The raw image data is received by the console, processed to render an image including features of concern, and rendered on the display device. Intravascular imaging data of blood vessels may provide useful information about the blood vessel that is different from or in addition to the information provided by the extravascular imaging data. For example, intravascular imaging data may provide data regarding the cross-section of the lumen, the thickness of deposits on a vessel wall, the diameter of the non-diseased portion of a vessel, the length of diseased sections, the makeup of deposits or plaque on the wall of the vessel, assessment of plaque burden or assessment of stent deployment.

These two general types of imaging modalities provide different imaging data, and therefore may be complimentary to each other. As such, in certain circumstances, it may be desirable to provide or use both general types of medical imaging modalities to evaluate or treat blood vessels. Additionally, it may be useful for the locations of the acquired intravascular imaging data/images to be correlated with their locations on the vessel roadmap obtained by the extravascular imaging data/images. It may be useful to coordinate or "register" (e.g. co-register) the imaging data rendered by the two different modalities. It may also be useful to display the co-registered extravascular imaging data and intravascular imaging data together, for example, on a common display monitor. Some example embodiments disclosed herein may include or relate to some or all of these aspects.

In accordance with some embodiments of the present disclosure, example method(s), system(s), device(s), or software are described herein. These examples include image data acquisition equipment and data/image processors, and associated software, for obtaining and registering (e.g. co-registering) imaging data rendered by the two distinct imaging modalities (e.g. extravascular imaging data and intravascular imaging data). Additionally, or alternatively, example method(s), system(s) or software may generate views on a single display that simultaneously provides extravascular images with positional information and intravascular images associated with an imaging probe (e.g., an IVUS or OCT probe) mounted upon an intravascular device.

Hemodynamic data can be useful in ascertaining the health of a patient. In some instances, hemodynamic information such as but not limited to pressure data can be helpful in ascertaining the health of the patient's vascular system. A variety of systems for obtaining hemodynamic data may be used. These systems for obtaining hemodynamic data can require one or more pullback runs in order to obtain data. In some instances, it may be useful to provide hemodynamic data without requiring any additional pullback runs, or any other processes or techniques for obtaining pressure information and/or other hemodynamic data.

FIG. 1 provides a schematic overview of an illustrative system 10 by which a neural network 12 may be trained in order to provide estimated hemodynamic values corresponding to particular intravascular images. The neural network 12 may be any of a variety of different types of neural networks. In some cases, the neural network 12 may represent a single neural network or a plurality of neural networks. In some instances, the neural network 12 may be manifested within a cloud-based server, for example. The neural network 12 may represent a CNN (convoluted neural network) that includes one or more transformers. In some cases, the neural network 12 may include a multi-layer neural network. These are just examples.

The neural network 12 may be adapted to learn. In some instances, the neural network 12 may be considered as including AI (artificial intelligence) and may optionally be considered as being capable of ML (machine learning). In order to train the neural network 12, the neural network 12 may be provided with preexisting data with which the neural network 12 can learn. In some instances, the neural network 12 may be trained how to associate particular hemodynamic properties or values with corresponding intravascular images. The neural network 12 may be provided with a plurality of intravascular image data sets that, as will be discussed with respect to FIGS. 9 to 11, be provided from a variety of different imaging modalities such as but not limited to intravascular ultrasound and optical coherence tomography data. The neural network 12 may be provided with a plurality of extravascular image data sets 16. The extravascular image data sets 16 may include fluoroscopic image data and/or angiographic image data. Examples of angiographic image data include but are not limited to 2D (two-dimensional) angiographic data, 3D (three-dimensional) angiographic data and 3D CTA (three dimensional computed tomography angiography).

Each of the plurality of extravascular image data sets 16 that are provided to the neural network 12 may be co-registered with a corresponding one of the plurality of intravascular image data sets 14, such as if a particular intravascular image data set 14 corresponds to a particular intravascular image data acquisition session (such as an imaging pullback run) for a particular portion of a blood vessel, from a particular starting point to an particular ending point, for a patient, and the corresponding extravascular image data set 16 corresponds to extravascular image data of the same portion of the same patient's same blood vessel, from the same starting point to the same ending point. In some cases, the portion of the patient's anatomy represented by a particular intravascular image data set 14 and that represented by a particular extravascular image data set 16 may not coincide exactly, but may overlap. In either event, each intravascular image data set 14 may be co-registered with the corresponding extravascular image data set 16, as indicated at block 18. Methods of co-registering the intravascular image data sets 14 and the extravascular image data sets 16 will be detailed with respect to FIGS. 9 to 11, to be discussed subsequently.

The neural network 12 may be provided with preexisting hemographic data sets 20. In some cases, a particular hemographic data set will represent hemographic data, such as but not limited to pressure data, for a particular patient. In some cases, each hemographic data set 20 will correspond to one or more pressure measurements taken at particular locations within a particular patient's particular blood vessel. In some instances, the one or more pressure measurements will correspond to particular locations within the particular blood vessel that coincide with the anatomy represented by a particular extravascular image data set 16. In other words, each of the hemodynamic data sets 20 may be co-registered with a corresponding extravascular image data set 16, as indicated at block 22.

It will be appreciated that by co-registering each of the intravascular image date sets 14 with a corresponding one of the extravascular image data sets 16, and that by co-registering each of the hemodynamic data sets 20 with a corresponding one of the extravascular image data sets 16, the neural network 12 is able to ascertain correlations between intravascular image data, extravascular image data and hemographic data. As a result, the neural network 12 is able to learn, by processing a number of intravascular image data sets 14, a number of corresponding extravascular image sets 16 and a number of corresponding hemographic data sets 20, and by being given or otherwise determining a co-registration between the intravascular data and the extravascular data, a co-registration between the extravascular data and the hemographic data, and thus a co-registration between the intravascular data and the hemographic data, how to estimate or predict hemographic data such as pressure measurements as a result of what the neural network 12 is seeing in a particular intravascular image or images.

At least some of the intravascular image data sets 14, at least some of the extravascular image data sets 16 and at least some of the hemodynamic data sets 20 may represent historical data that has been previously obtained and saved. At least some of the intravascular image data sets 14, at least some of the extravascular image data sets 16 and at least some of the hemodynamic data sets 20 may represent data captured from volunteers who undergo these imaging processes in order to contribute useful data for training the neural network 12. At least some of the intravascular image data sets 14, at least some of the extravascular image data sets 16 and at least some of the hemodynamic data sets 20 may represent patient data that can be independently captured for research purposes as patients undergo intravascular imaging, extravascular imaging and hemodynamic measurements for any of a variety of different clinical purposes.

As a result of training, the neural network 12 may be considered as having evolved into a trained neural network 24. In this, the distinction between the neural network 12 and the trained neural network 24 may not simply be binary, i.e., the neural network 12 turns into the trained neural network 24 upon completion of sufficient training. In some instances, training may continue indefinitely. A neural network that is considered to have been trained may be periodically tested, such as by providing the neural network 24 with intravascular data while hemodynamic data obtained from the same patient, from the same anatomy and at essentially the same time, may be used as a check against the estimated hemodynamic measurements provided by the trained neural network 24. If the actual hemodynamic measurements are close to the predicted hemodynamic measurements, this can be construed as an indication that the trained neural network 24 is indeed well trained. If, however, there are discrepancies or even substantial discrepancies between the actual hemodynamic measurements and to the predicted hemodynamic measurements, this can be construed as an indication that the trained neural network 24 may benefit from additional training.

Once the neural network 12 has been trained into the trained neural network 24, the trained neural network 24 may be used to provide estimated hemodynamic values in response to an intravascular pullback run such as but not limited to an IVUS (intravascular ultrasound) pullback run. Performing an intravascular pullback run can provide a source of intravascular images 26. Feeding the intravascular images 26 to the trained neural network 24 can result in predicted hemodynamic values 28. The trained neural network 24 will have learned, through training, what hemodynamic values 28 have historically resulted from a particular set of parameters defining an intravascular image. For example, a particular type and size of obstruction within a blood vessel historically results in particular changes in pressure readings. Once the trained neural network 24 determines the estimated hemodynamic values, the intravascular images and the corresponding predicted hemodynamic values may be outputted onto any available screen, as indicated at block 30. In some cases, for example, the intravascular images and the corresponding predicted hemodynamic values may be outputted via a computer, such as but not limited to the computer system/sub-system 130 described with respect to FIG. 9.

Figure 2A:
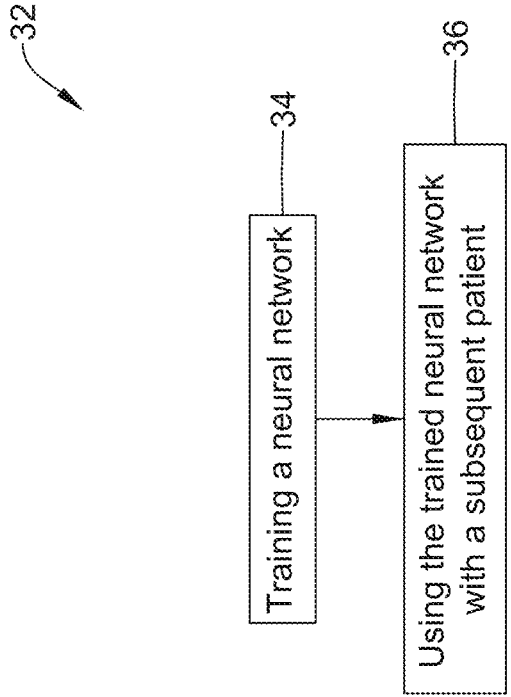
FIG. 2A is a flow diagram showing an illustrative method of estimating patient hemodynamic data.
Figure 2B:
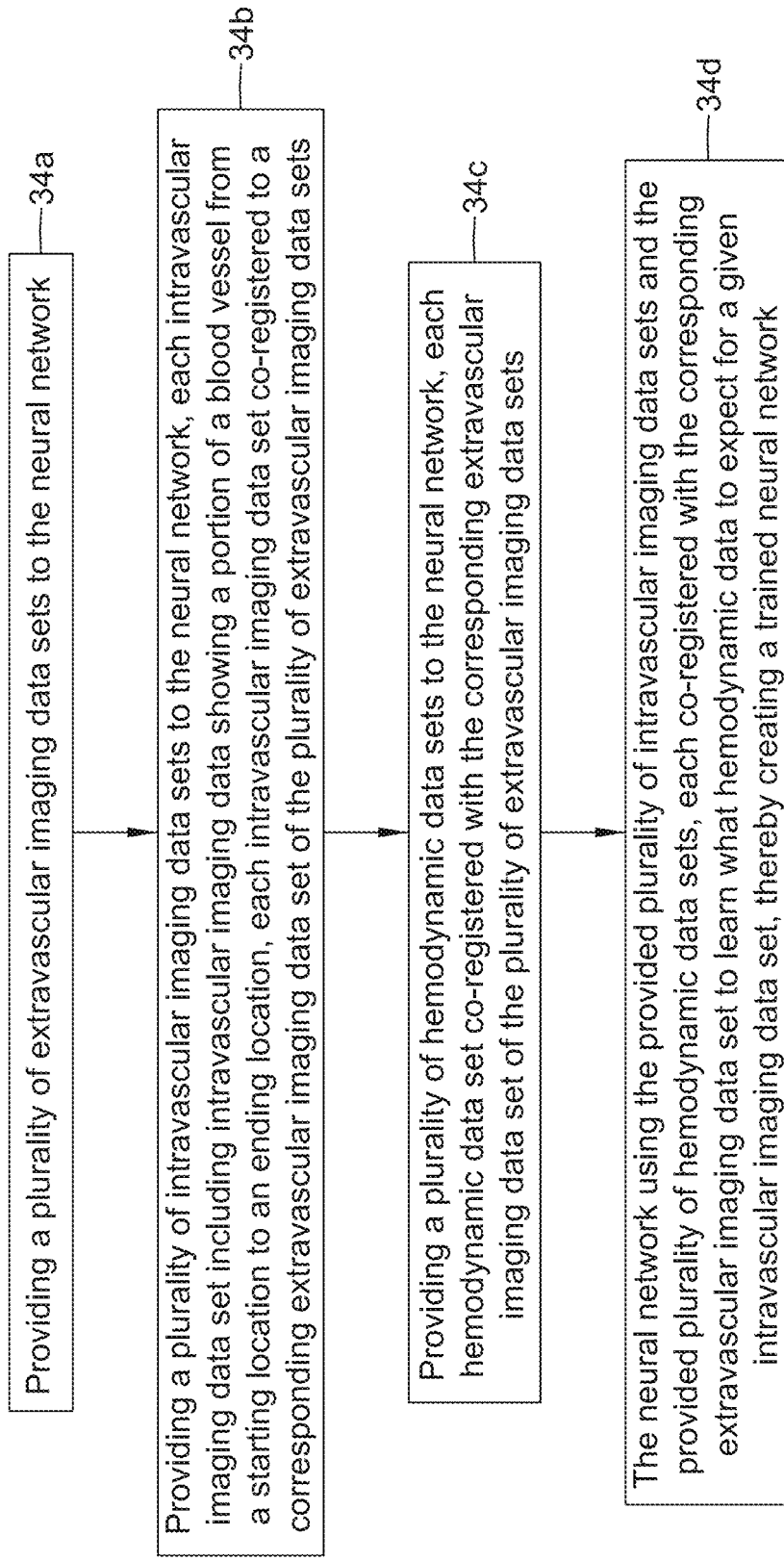
FIG. 2B is a flow diagram showing an illustrative method of training a neural network as part of the method of FIG. 2A.
Figure 2C:
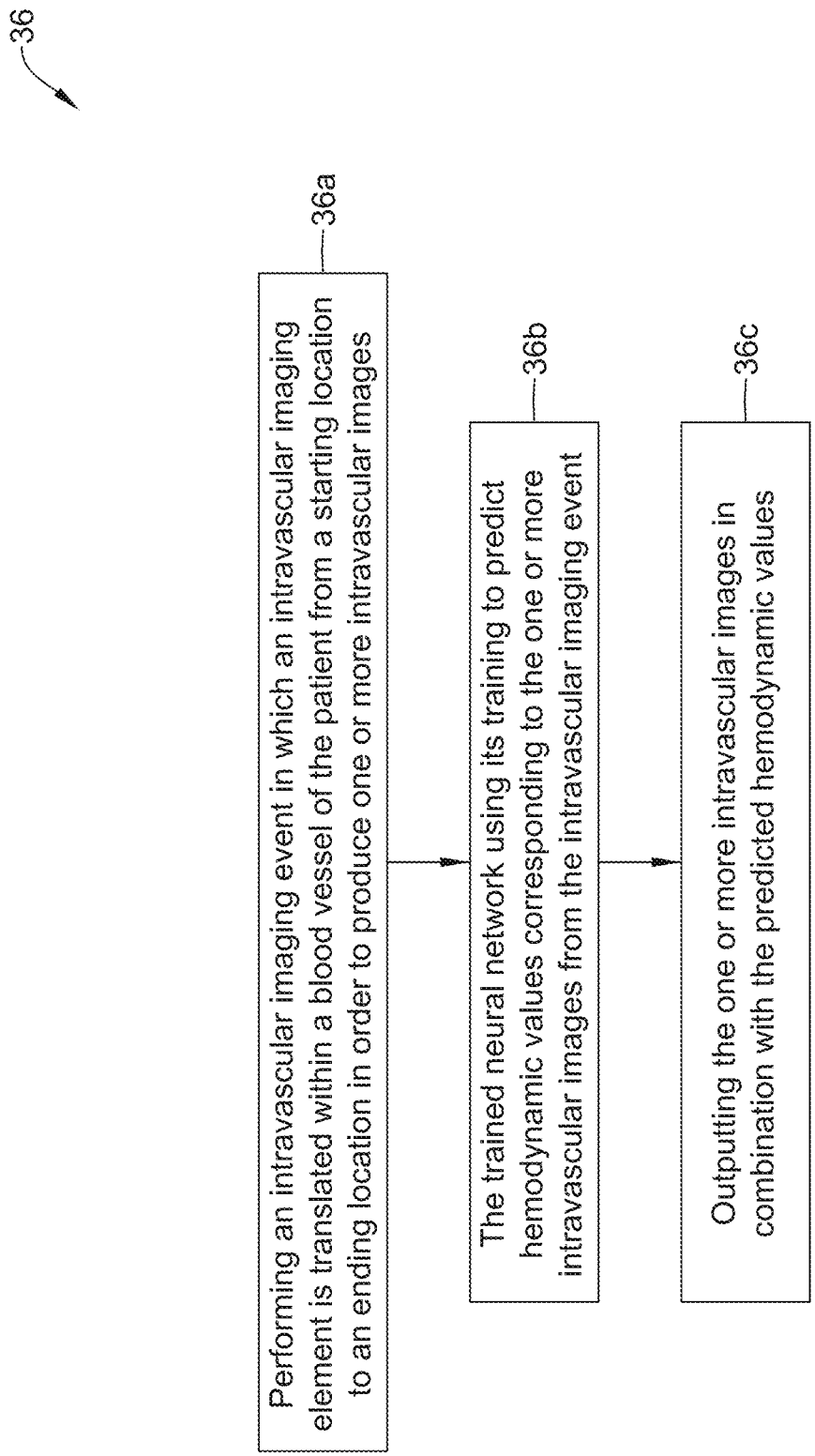
FIG. 2C is a flow diagram showing an illustrative method of using a trained neural network as part of the method of FIG. 2A.

FIGS. 2A, 2B and 2C are flow diagrams that in combination provide an illustrative method 32 for estimating patient hemodynamic data. FIGS. 2B and 2C provide the detail not outlined in FIG. 2A. The method 32 includes training a neural network (such as the neural network 12), as indicated at block 34, and using the trained neural network (such as the trained neural network 24) with a subsequent patient, as indicated at block 26.

In some instances, the neural network may include an ensemble of neural networks. The neural network may include a CNN (convoluted neural network) with transformers. In some cases, the neural network may include a multi-layer neural network. The multi-layer neural network may, for example, include a hemodynamic term within the loss function.

FIG. 2B shows details regarding the method 34 for training the neural network. A plurality of extravascular imaging data sets are provided to the neural network, as indicated at block 34a. A plurality of intravascular imaging data sets are provided to the neural network, each intravascular imaging data set including intravascular imaging data showing a portion of a blood vessel from a starting location to an ending location, each intravascular imaging data set co-registered to a corresponding extravascular imaging data set of the plurality of extravascular imaging data sets, as indicated at block 34b. At least some of the plurality of intravascular imaging data sets provided while training the neural network include intravascular ultrasound data. At least some of the plurality of intravascular imaging data sets provided while training the neural network include optical coherence tomography data.

A plurality of hemodynamic data sets are provided to the neural network, each hemodynamic data set co-registered with the corresponding extravascular imaging data set of the plurality of extravascular imaging data sets, as indicated at block 34c. The neural network uses the provided plurality of intravascular imaging data sets and the provided plurality of hemodynamic data sets, each co-registered with the corresponding extravascular imaging data set to learn what hemodynamic data to expect for a given intravascular imaging data set, thereby creating a trained neural network, as indicated at block 34d. In some instances, at least some of the plurality of hemodynamic data sets provided while training the neural network comprise pressure data obtained by any hyperemic or non-hyperemic index.

In some cases, at least some of the plurality of extravascular imaging data sets provided while training the neural network include fluoroscopic image data. At least some of the plurality of extravascular imaging data sets provided while training the neural network may include angiographic image data. The angiographic data may include two-dimensional angiographic image data, for example, and/or may include three-dimensional angiographic image data. In some instances, at least some of the angiographic data may include 3D CTA (three dimensional computed tomography angiography).

In some instances, at least some of the plurality of intravascular imaging data sets and at least some of the corresponding hemodynamic data sets may be co-registered using their corresponding points in 2D or 3D space on the corresponding extravascular imaging data set. In some instances, at least some of the plurality of intravascular imaging data sets provided while training the neural network include quantitative data such as lumen borders, vessel borders, side-branch borders, blood speckle density and cardiac cycle parameters, and the quantitative data is used in training the neural network.

FIG. 2C shows details regarding the method 36 for using the trained the neural network (such as the trained neural network 24) with a subsequent patient. An intravascular imaging event is performed in which an intravascular imaging element is translated within a blood vessel of the patient from a starting location to an ending location in order to produce one or more intravascular images, as indicated at block 36a. The trained neural network uses its training to predict hemodynamic values corresponding to the one or more intravascular images from the intravascular imaging event, as indicated at block 36b. The one or more intravascular images are outputted in combination with the predicted hemodynamic values, as indicated at block 36c.

In some instances, the one or more intravascular images from the intravascular imaging event include an anatomical landmark and the predicted hemodynamic values include a predicted pressure value proximate the anatomical landmark. In some cases, the plurality of intravascular imaging data sets (used for training the neural network) may include indications of key artery locations such as proximal reference, minimum lumen and distal reference and the one or more intravascular images from the intravascular imaging event includes these key locations. In some cases, the predicted pressure values include a predicted pressure value proximate the key locations.

In some instances, outputting the one or more intravascular images in combination with the predicted hemodynamic values may include displaying the one or more intravascular images and the predicted hemodynamic values on a graphical user interface of a signal processing unit. Displaying the one or more intravascular images and the predicted hemodynamic values on a graphical user interface of a signal processing unit may include displaying a fully co-registered display of the predicted hemodynamic values with the intravascular images. In some instances, displaying the one or more intravascular images and the predicted hemodynamic values on a graphical user interface of a signal processing unit may include displaying a fully tri-registered display of the predicted hemodynamic values with the intravascular images and a corresponding extravascular image.

Figure 3:
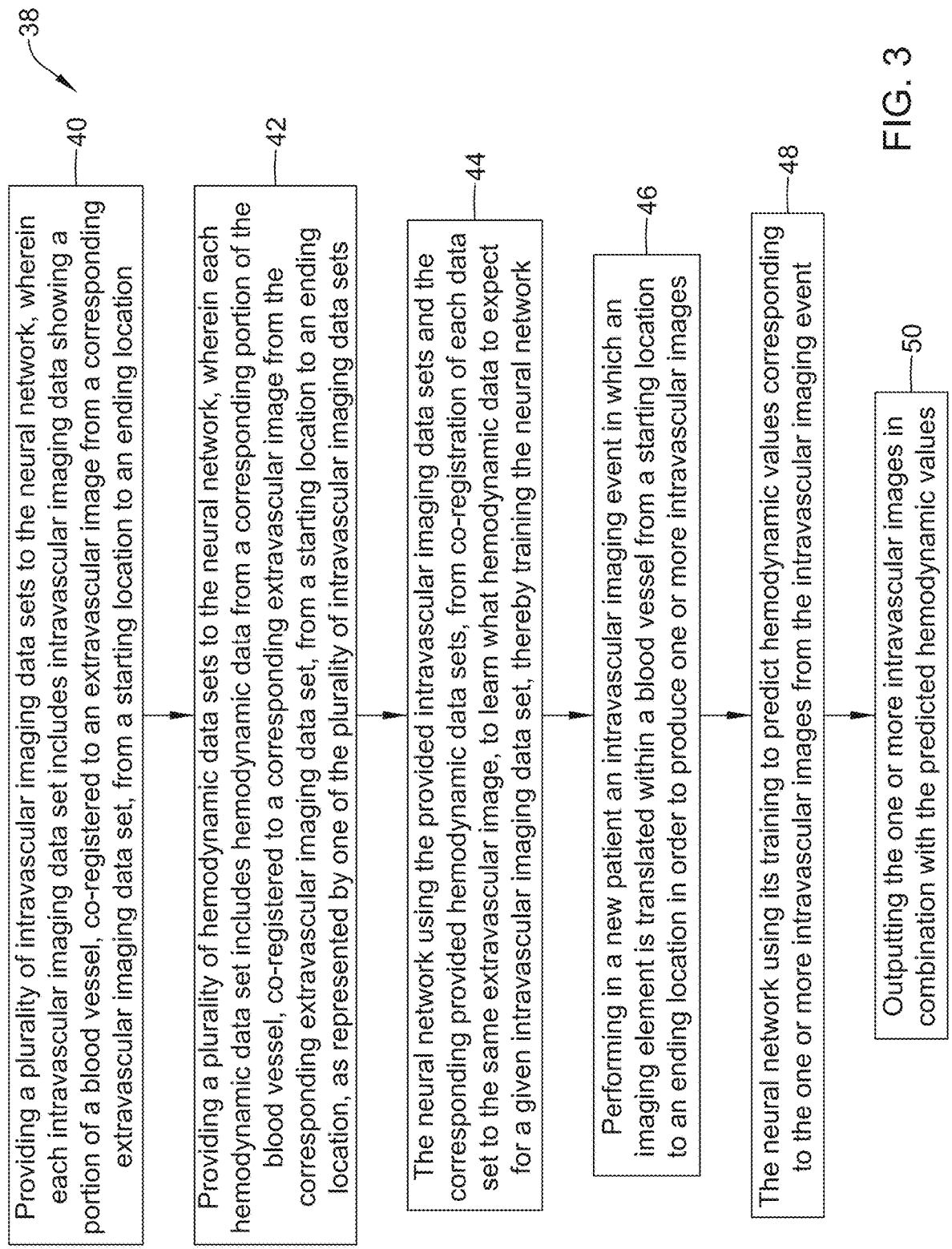
FIG. 3 is a flow diagram showing an illustrative method of processing imaging data.

FIG. 3 is a flow diagram showing an illustrative method 38 for processing imaging data. The method 38 includes providing a plurality of intravascular imaging data sets to a neural network (such as the neural network 12), wherein each intravascular imaging data set includes intravascular imaging data showing a portion of a blood vessel, co-registered to an extravascular image from a corresponding extravascular imaging data set, from a starting location to an ending location, as indicated at block 40. At least some of the plurality of intravascular imaging data sets may include intravascular ultrasound data. At least some of the plurality of intravascular imaging data sets may include optical coherence tomography data. At least some of the plurality of extravascular imaging data sets may include fluoroscopic image data. At least some of the plurality of extravascular imaging data sets may include angiographic image data.

A plurality of hemodynamic data sets are provided to the neural network, wherein each hemodynamic data set includes hemodynamic data from a corresponding portion of the blood vessel, co-registered to a corresponding extravascular image from the corresponding extravascular imaging data set, from a starting location to an ending location, as represented by one of the plurality of intravascular imaging data sets, as indicated at block 42. At least some of the plurality of hemodynamic data sets may include pressure data obtained by any hyperemic or non-hyperemic index. The neural network uses the provided intravascular imaging data sets and the corresponding provided hemodynamic data sets, from co-registration of each data set to the same extravascular image, to learn what hemodynamic data to expect for a given intravascular imaging data set, thereby training the neural network, as indicated at block 44.

The method 38 includes performing in a new patient an intravascular imaging event in which an imaging element is translated within a blood vessel from a starting location to an ending location in order to produce one or more intravascular images, as indicated at block 46. The neural network uses its training to predict hemodynamic values corresponding to the one or more intravascular images from the intravascular imaging event, as indicated at block 48. The one or more intravascular images are outputted in combination with the predicted hemodynamic values, as indicated at block 50.

Figure 4:
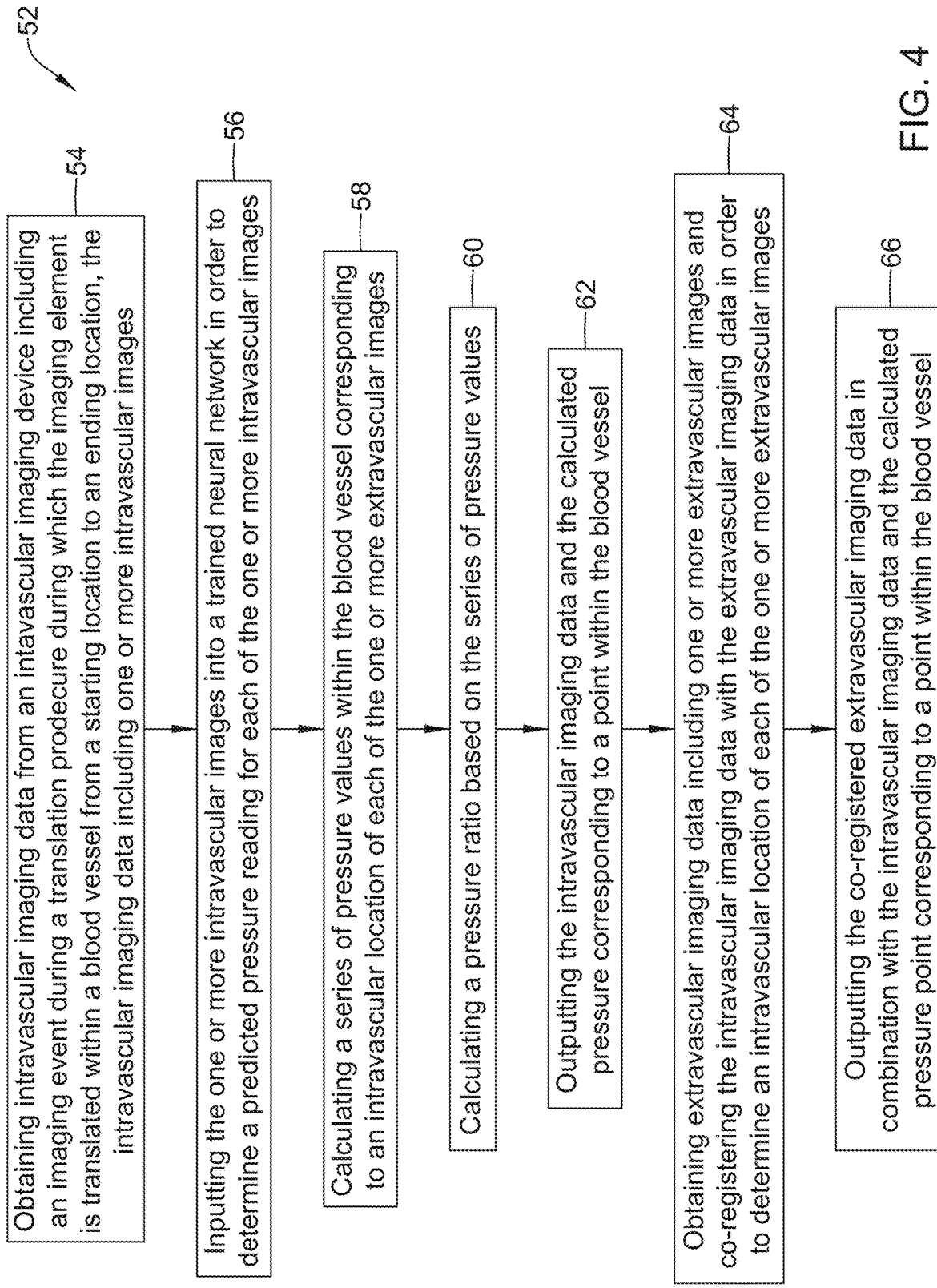
FIG. 4 is a flow diagram showing an illustrative method of processing patient imaging data.

FIG. 4 is a flow diagram showing an illustrative method 52 of processing patient imaging data. The method 52 includes obtaining intravascular imaging data from an intravascular imaging device including an imaging event during a translation procedure during which the imaging element is translated within a blood vessel from a starting location to an ending location, the intravascular imaging data including one or more intravascular images, as indicated at block 54. The one or more intravascular images are inputted into a trained neural network (such as the trained neural network 24) in order to determine a predicted pressure reading for each of the one or more intravascular images, as indicated at block 56. A series of pressure values within the blood vessel corresponding to an intravascular location of each of the one or more extravascular images is calculated, as indicated at block 58. A pressure ratio is calculated based on the series of pressure values, as indicated at block 60.

In some cases, the method 52 may further include outputting the intravascular imaging data and the calculated pressure corresponding to a point within the blood vessel, as indicated at block 62. In some instances, the method 52 may further include obtaining extravascular imaging data including one or more extravascular images, and co-registering the intravascular imaging data with the extravascular imaging data in order to determine an intravascular location of each of the one or more extravascular images, as indicated at block 64. For example, obtaining extravascular imaging data may include obtaining extravascular imaging data corresponding to the blood vessel from the starting location to the ending location. In some instances, the method 52 may further include also outputting the co-registered extravascular imaging data in combination with the intravascular imaging data and the calculated pressure point corresponding to a point within the blood vessel, as indicated at block 66.

In some instances, the intravascular imaging data includes intravascular ultrasound data. In some cases, the intravascular imaging data includes optical coherence tomography data. The extravascular imaging data may include fluoroscopic image data, for example, or angiographic image data.

Figure 5:
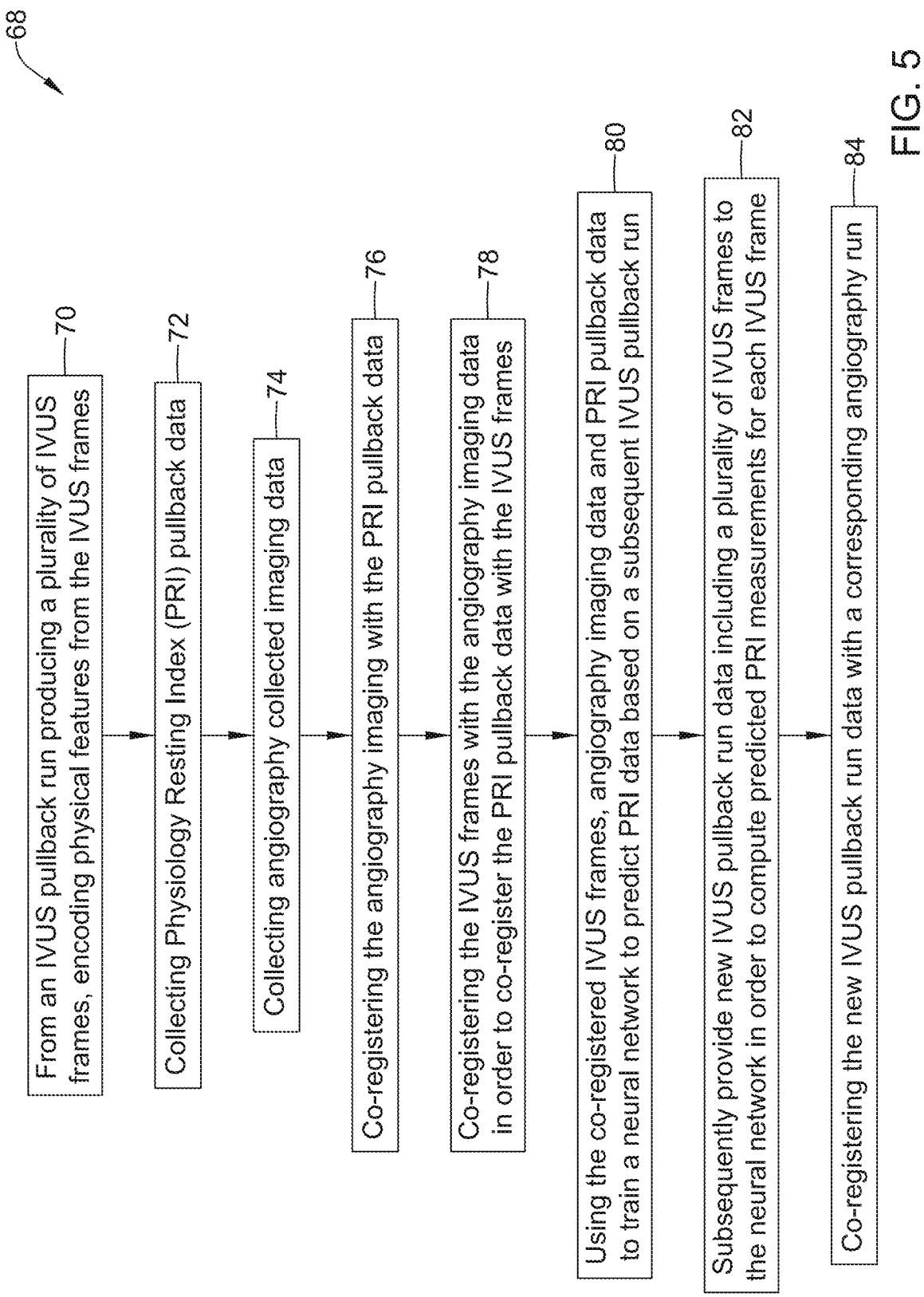
FIG. 5 is a flow diagram showing an illustrative method of processing imaging data.

FIG. 5 is a flow diagram showing an illustrative method 68 of processing imaging data. The method 68 includes, from an IVUS pullback run producing a plurality of IVUS frames, encoding physical features from the IVUS frames, as indicated at block 70. Physiology Resting Index (PRI) pullback data is collected, as indicated at block 72. Angiography-collected imaging data is collected, as indicated at block 74. The angiography imaging is co-registered with the PRI pullback data, as indicated at block 76. The IVUS frames are co-registered with the angiography imaging data in order to co-register the PRI pullback data with the IVUS frames, as indicated at block 78. The co-registered IVUS frames, angiography imaging data and PRI pullback data are used to train a neural network to predict PRI data based on a subsequent IVUS pullback run, as indicated at block 80. New IVUS pullback run data including a plurality of IVUS frames is subsequently provided to the neural network in order to compute predicted PRI measurements for each IVUS frame, as indicated at block 82. In some cases, the method 68 may further include co-registering the new IVUS pullback run data with a corresponding angiography run, as indicated at block 84.

Figure 6:
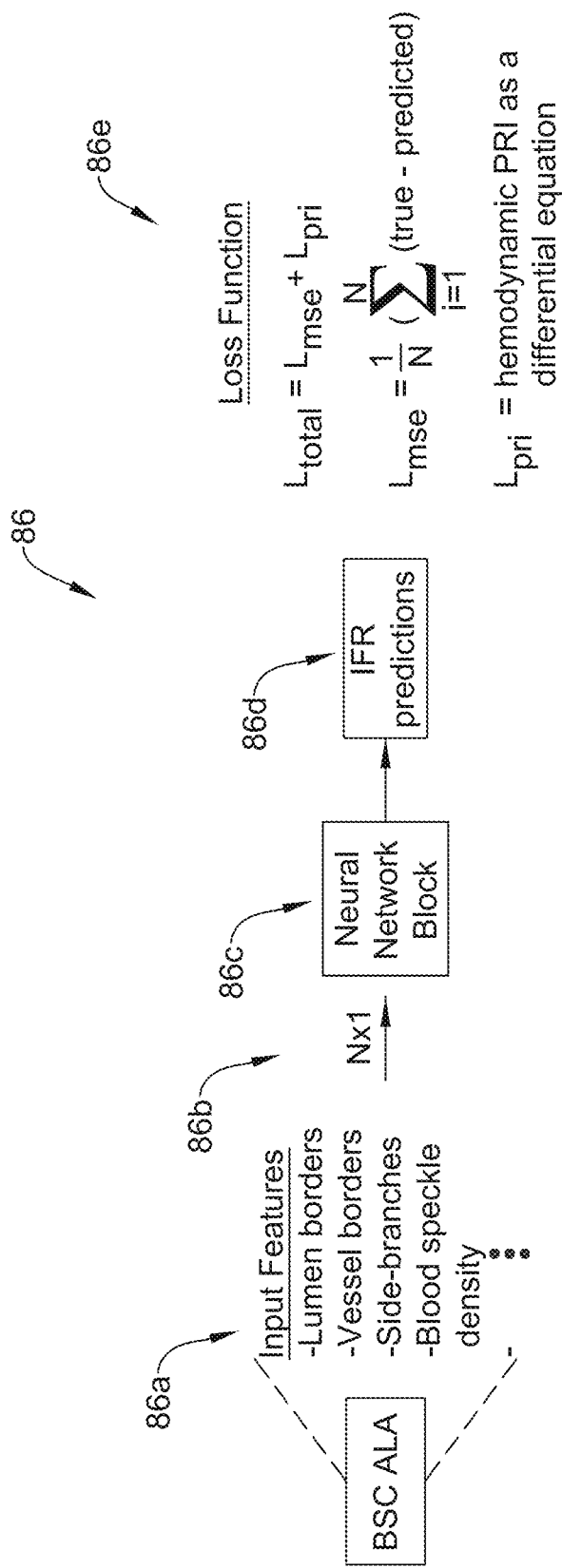
FIG. 6 is a schematic view of a illustrative model.
Figure 7:
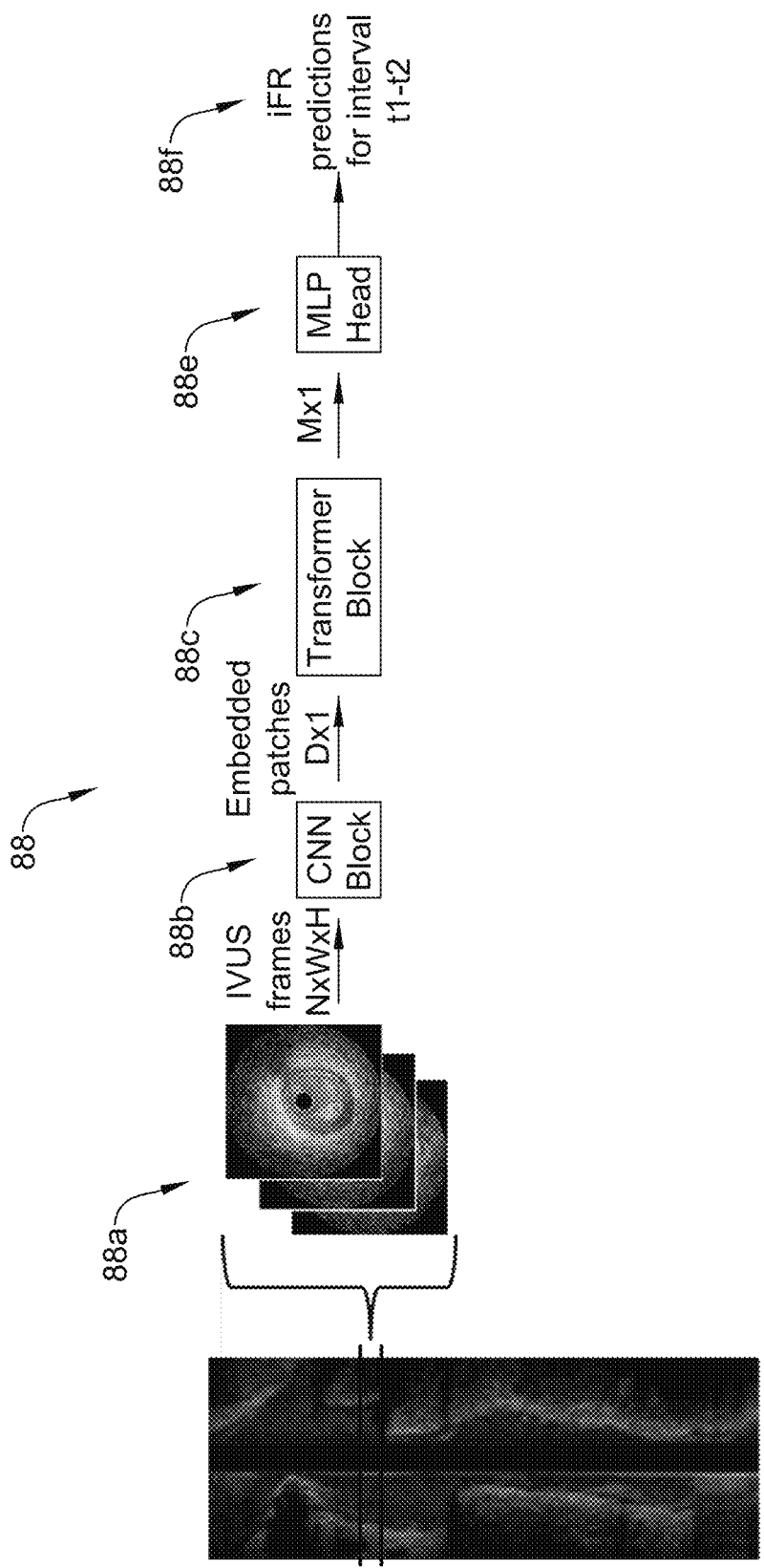
FIG. 7 is a schematic view of a illustrative model.
Figure 8:
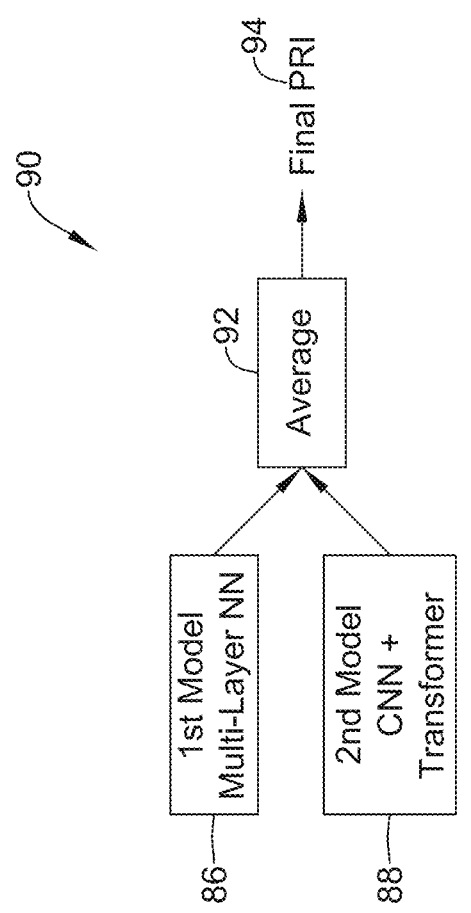
FIG. 8 is a schematic view of an illustrative model.

FIGS. 6 through 8 provide schematic illustrations of illustrative models that may be used in training the neural network 12. FIG. 6 is a schematic view of a model 86 that may be implemented within the neural network 12. The model 86 includes a number of inputs 86a, including but not limited to lumen borders, vessel borders, side-branches and blood speckle density. The inputs 86a are provided via an N×1 86b to a neural network block 86c. The neural network 86c outputs iFR predictions 86d. The model 86 employs a loss function 86e. The model 86 integrates a PRI hemodynamic model as an extra term in the loss function for increased PRI prediction unit accuracy. The model 86 takes inputs as a feature vector of derived lumen borders, vessel borders, side-branches, blood speckle density, cardiac cycle, etc. The input feature vector represents the variables of the hemodynamic PRI equation.

FIG. 7 is a schematic view of a model 88 that may be implemented within the neural network 12. IVUS (intravascular ultrasound) images 88a are provided to a CNN block 88b. Embedded patches are provided to a transformer block 88c. From there, signals pass to an MLP head 88e and result in IFR predictions 88f. The model 88 processes IVUS images directly with CNNs and/or ViT to predict the PRI value.

FIG. 8 schematically shows a model 90 that is a combination of the model 86 and the model 88. The outputs from the model 86 and the model 88 are provided to an AVERAGING block 92. The output from the AVERAGING block 92 is a final PRI 94. The model 90 provides a specific, accurate, efficient and real-time AI (artificial intelligence) model.

Figure 9:
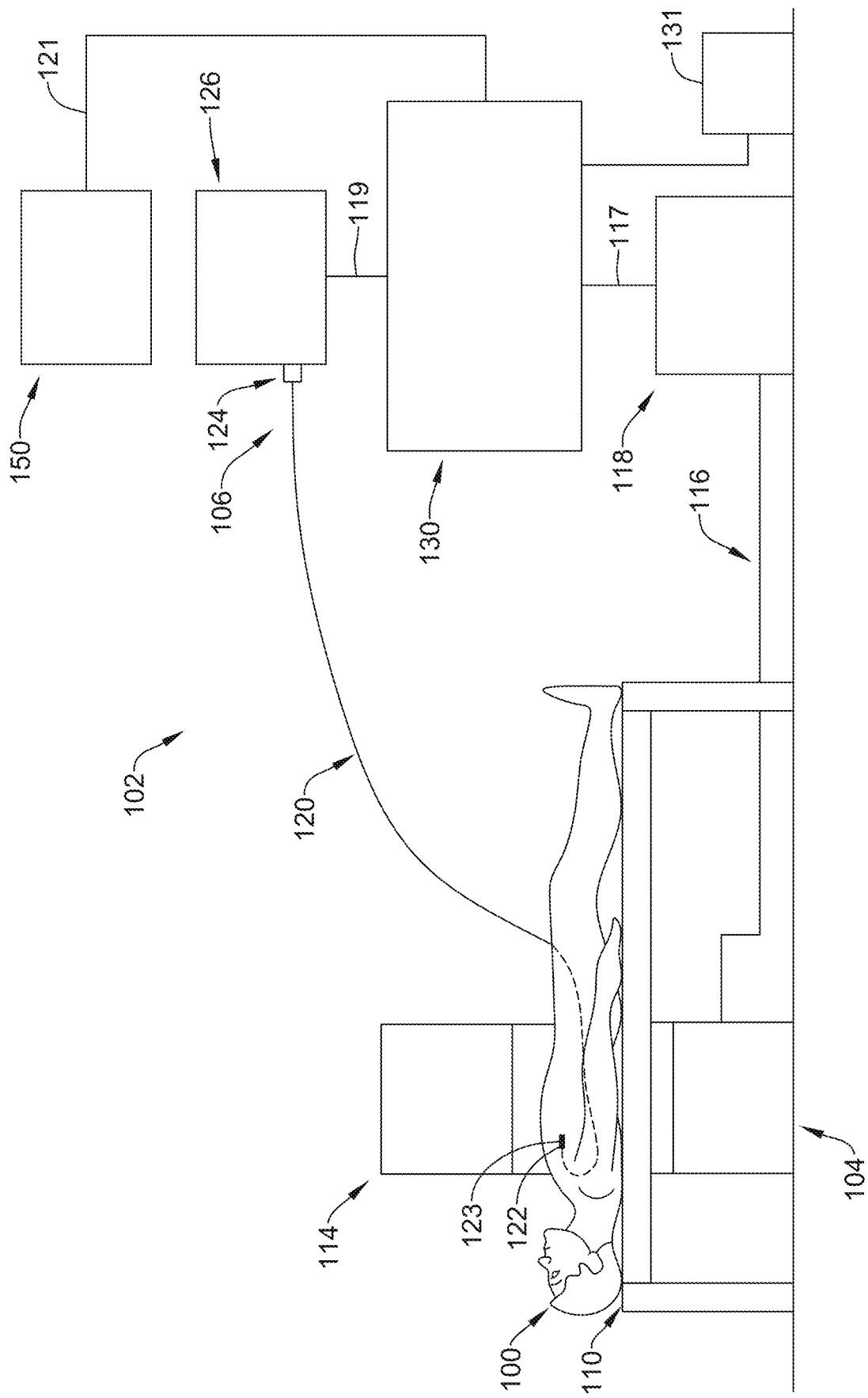
FIG. 9 is a schematic illustration of an exemplary system for use in vascular imaging co-registration.

FIG. 9 is schematic depiction of an exemplary system 102 that may be used in conjunction with carrying out an embodiment of the present disclosure through obtaining and co-registering extravascular image data (e.g. angiogram/fluoroscopy) and intravascular image data (e.g. IVUS or OCT images). The system 102 may include an extravascular imaging system/sub-system 104 (e.g. angiography/fluoroscopy system) for obtaining/generating extravascular imaging data. The system 102 may also include an intravascular imaging system/sub-system 106 (e.g. IVUS or OCT) for obtaining/generating intravascular imaging data. The system 102 may include a computer system/sub-system 130 including one or more controller or processor, memory and/or software configured to execute a method for vascular imaging registration of the obtained extravascular imaging data and the obtained intravascular imaging data.

The extravascular imaging data may be radiological image data obtained by the angiography/fluoroscopy system 104. Such angiography/fluoroscopy systems are generally well known in the art. The angiography/fluoroscopy system 104 may include an angiographic table 110 that may be arranged to provide sufficient space for the positioning of an angiography/fluoroscopy unit c-arm 114 in an operative position in relation to a patient 100 on the table 110. Raw radiological image data acquired by the angiography/fluoroscopy c-arm 114 may be passed to an extravascular data input port 118 via a transmission cable 116. The input port 118 may be a separate component or may be integrated into or be part of the computer system/sub-system 130. The angiography/fluoroscopy input port 118 may include a processor that converts the raw radiological image data received thereby into extravascular image data (e.g angiographic/fluoroscopic image data), for example, in the form of live video, DICOM, or a series of individual images. The extravascular image data may be initially stored in memory within the input port 118, or may be stored within the computer 130. If the input port 118 is a separate component from the computer 130, the extravascular image data may be transferred to the computer 130 through the cable 117 and into an input port in the computer 130. In some alternatives, the communications between the devices or processors may be carried out via wireless communication, rather than by cables.

The intravascular imaging data may be, for example, IVUS data or OCT data obtained by the intravascular imaging system/sub-system 106 (e.g. an IVUS or OCT system). Such IVUS and OCT systems are generally well known in the art. The intravascular sub-system 106 may include an intravascular imaging device such as an imaging catheter 120, for example an IVUS or OCT catheter. The imaging device 120 is configured to be inserted within the patient 100 so that its distal end, including a diagnostic assembly or probe 122 (e.g. an IVUS or OCT probe), is in the vicinity of a desired imaging location of a blood vessel. A radiopaque material or marker 123 located on or near the probe 122 may provide indicia of a current location of the probe 122 in a radiological image.

By way of example, in the case of IVUS intravascular imaging data, the diagnostic probe 122 generates ultrasound waves, and receives ultrasound echoes representative of a region proximate the diagnostic probe 122. The probe 122 or catheter 120 may convert the ultrasound echoes into corresponding signals, such as electrical or optical signals. The corresponding signals are transmitted along the length of the imaging catheter 120 to a proximal connector 124. The proximal connector 124 of the catheter 120 is communicatively coupled to processing unit or control module 126. IVUS versions of the probe 122 come in a variety of configurations including single and multiple transducer element arrangements. It should be understood that in the context of IVUS, a transducer may be considered an imaging element. In the case of multiple transducer element arrangements, an array of transducers is potentially arranged: linearly along a lengthwise axis of the imaging catheter 120, curvilinearly about the lengthwise axis of the catheter 120, circumferentially around the lengthwise axis, etc.

Figure 10:
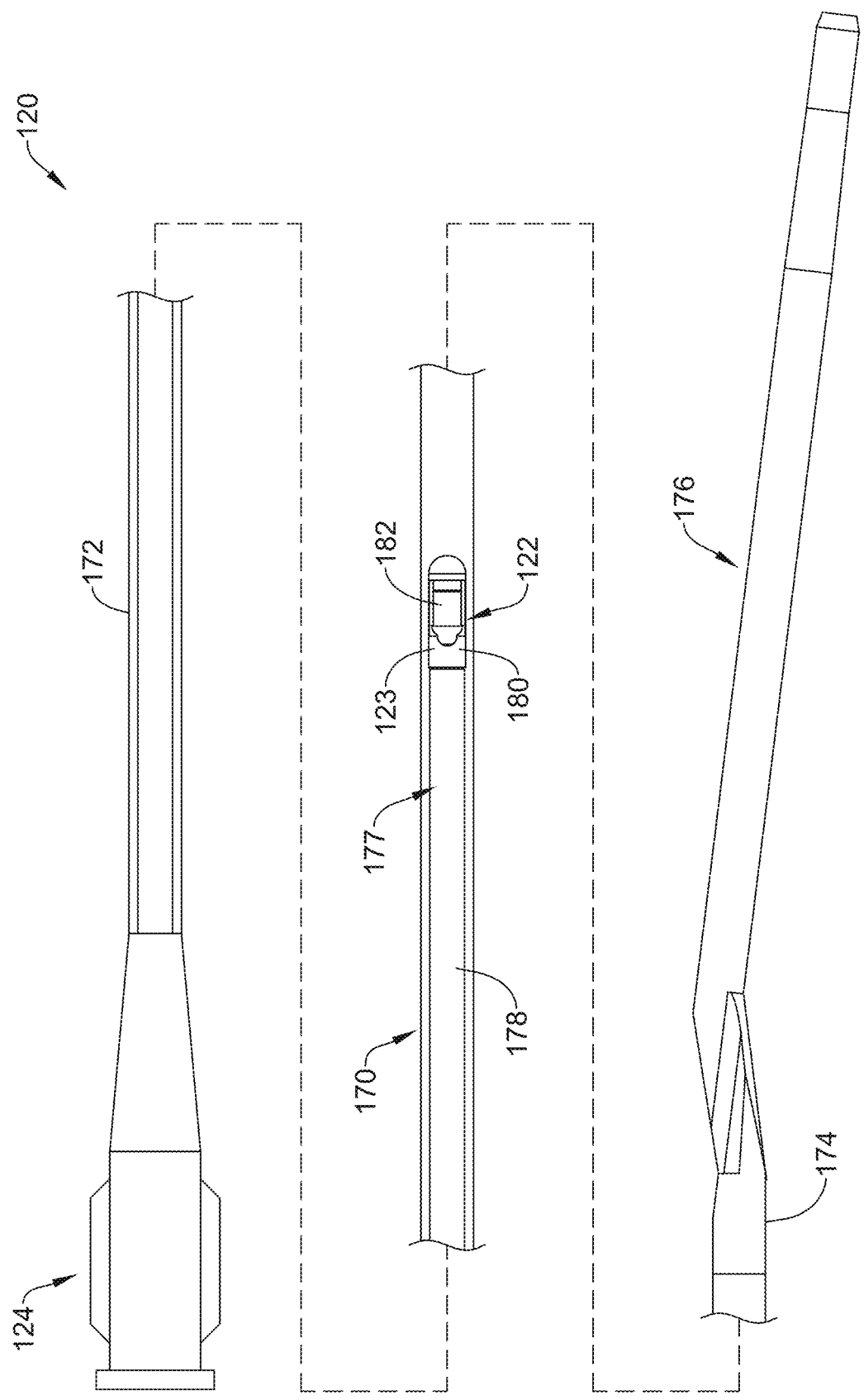
FIG. 10 is a schematic illustration of an exemplary intravascular imaging catheter, shown in partial cross-sectional view.
Figure 11:
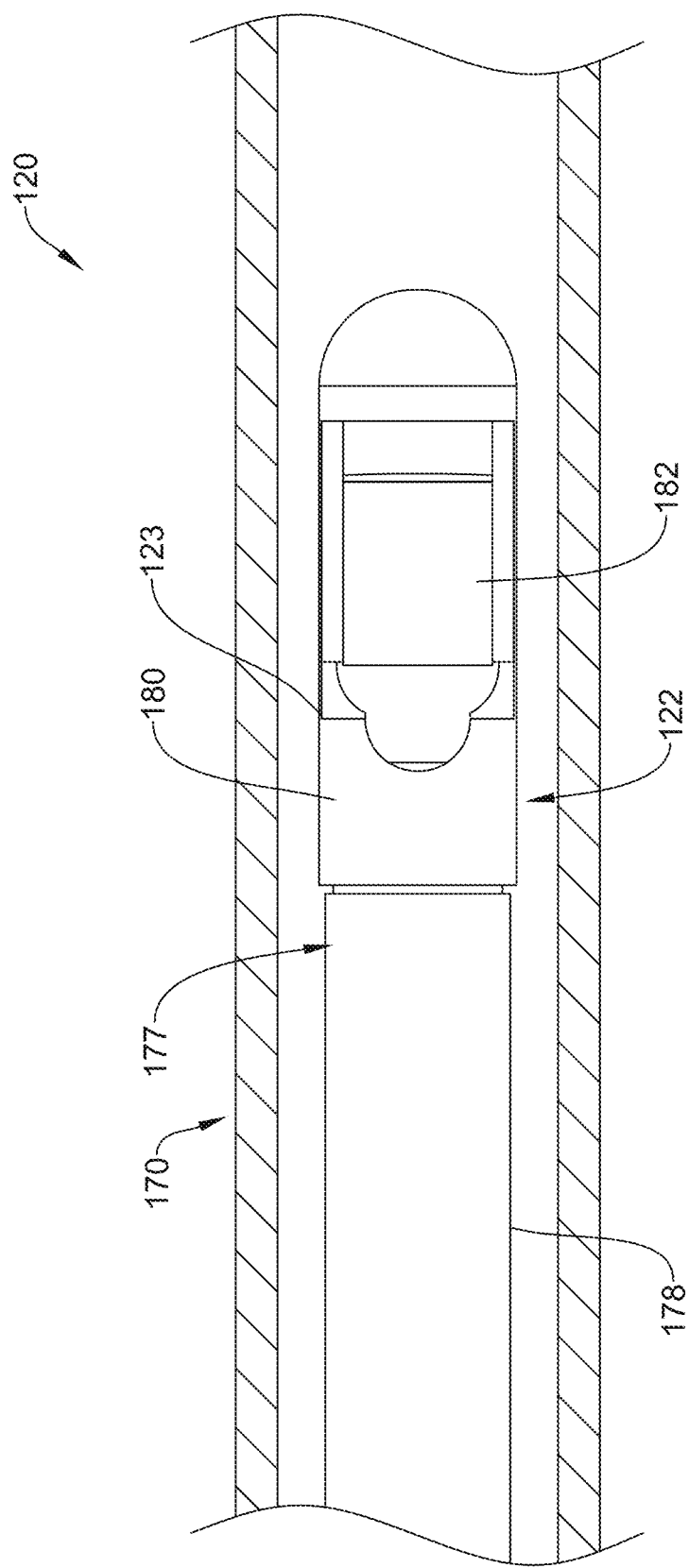
FIG. 11 is a schematic illustration of the distal portion of the exemplary intravascular imaging catheter of FIG. 10, shown in cross-section.

One example of an IVUS intravascular imaging catheter 120 is shown in FIGS. 10 and 11. The imaging catheter 120 may include an elongate shaft 170 having a proximal end region 172 and a distal end region 174. The proximal hub or connector 124 may be coupled to or otherwise disposed adjacent to the proximal end region 172. A tip member 176 may be coupled to or otherwise disposed adjacent to the distal end region 174. The tip member 176 may include a guidewire lumen, an atraumatic distal end, one or more radiopaque markers, or other features. An imaging assembly 177 may be disposed within the shaft 170. In general, the imaging assembly 177 (which may include an imaging probe 122 including an imaging element 182) may be used to capture/generate images of a blood vessel. In some instances, the medical device may include devices or features similar to those disclosed in U.S. Patent Application Pub. No. US 2012/0059241 and U.S. Patent Application Pub. No. US 2017/0164925, the entire disclosures of which are herein incorporated by reference. In at least some instances, the medical device 120 may resemble or include features that resemble the OPTICROSS™ Imaging Catheter, commercially available from BOSTON SCIENTIFIC, Marlborough, MA.

As shown in FIG. 11, the imaging assembly 177 may include a drive cable or shaft 178, an imaging probe 122 including a housing 180 and an imaging element or transducer 182. The imaging probe 122 or housing 180 may be coupled to the drive cable 178. The transducer 182 may be rotatable or axially translatable relative to the shaft 170. For example, the drive cable 178 may be rotated or translated in order to rotate or translate the transducer 182. The probe 122 or housing 180, for example, may include or be made of a radiopaque material or marker 123, which may provide indicia of a current location of the probe 122 in a radiological image.

Referring back to FIG. 9, by way of another example, the device 120 may be an OCT catheter used to collect OCT intravascular data. The OCT catheter 120 may include a diagnostic probe 122 that generates or propagates a light beam that is directed at tissue, and a portion of this light that reflects from sub-surface features is collected and is representative of a region proximate the diagnostic probe 122. In OCT, the diagnostic probe 122 will include an optical imager for delivery and collection of the light. It should be understood that in the context of OCT, the optical imager in the probe 122 may be considered an imaging element. A technique called interferometry may be used to record the optical path length of received photons allowing rejection of most photons that scatter multiple times before detection. Thus, OCT can build up images of thick samples by rejecting background signal while collecting light directly reflected from surfaces of interest. The probe 122 or catheter 120 may transmit the optical or light signals along the shaft, or may convert light signals into corresponding signals, such as electrical or optical signals, that may be transmitted along the length of the imaging catheter 120 to a proximal connector 124. The proximal connector 124 of the catheter 120 is communicatively coupled to a processing unit or control module 126. The probe 122 or housing 180, may include or be made of a radiopaque material or marker 123, which may provide indicia of a current location of the probe 122 in a radiological image Raw intravascular image data (e.g. raw IVUS or OCT data) may be acquired by the imaging catheter 120 and may be passed to the control module 126, for example via connector 124. The control module 126 may be a separate component or may be integrated into or be part of the computer system/sub-system 130. The control module 126 may include a processor that converts or is configured to convert the raw intravascular image data received via the catheter 120 into intravascular image data (e.g IVUS or OCT image data), for example, in the form of live video, DICOM, or a series of individual images. The intravascular imaging data may include transverse cross-sectional images of vessel segments. Additionally, the intravascular imaging data may include longitudinal cross-sectional images corresponding to slices of a blood vessel taken along the blood vessel's length. The control module 126 may be considered an input port for the computer system/subsystem 130, or may be considered to be connected to an input port of the computer 130, for example, via cable 119 or a wireless connection. The intravascular image data may be initially stored in memory within the control module 126, or may be stored within memory in the computer system/subsystem 130. If the control module 126 is a separate component from the computer system/sub-system 130, the intravascular image data may be transferred to the computer 130, for example through the cable 119, and into an input port in the computer 130. Alternatively, the communications between the devices or processors may be carried out via wireless communication, rather than by cable 119.

The control module 126 may also include one or more components that may be configured to operate the imaging device 120 or control the collection of intravascular imaging data. For example, in the case of an IVUS system, the control module 126 may include one or more of a processor, a memory, a pulse generator, a motor drive unit, or a display. As another example, in the case of an OCT system, the control module 126 may include one or more of a processor, a memory, a light source, an interferometer, optics, a motor drive unit, or a display. In some cases, the control module 126 may be or include a motor drive unit that is configured to control movement of the imaging catheter 120. Such a motor drive unit may control rotation or translation of the imaging catheter 120 or components thereof. In some instances, the control module 126 or motor drive unit may include an automatic translation system that may be configured to translate the imaging catheter 120 in a controlled/measured matter within the patient 100. Such an automatic translation system may be used such that during a translation procedure, the imaging catheter 120 (including an imaging element) is translated within the blood vessel from a starting location to an ending location at a constant or known speed. (e.g. the imaging catheter 120 is translated at a specific rate for a known amount of time). In other embodiments, the translation may be done manually. Translation procedures may be, for example, a "pullback" procedure (where the catheter 120 is pulled through the vessel) or a "push-through" procedure (where the catheter 120 is pushed through the vessel). The control module 126 may also be configured from or include hardware and software configured to control intravascular imaging and data collection. For example, the control module 126 may include control features to turn on/off imaging or data collection from/to the catheter 120.

The computer system/sub-system 130 can include one or more controller or processor, one or more memory, one or more input port, one or more output port and/or one or more user interface. The computer 130 obtains or is configured to obtain intravascular image data from or through the intravascular imaging system/sub-system 106 (e.g. IVUS or OCT) and extravascular image data from or through the extravascular imaging system/sub-system 104 (e.g. angiography/fluoroscopy system). The computer 130, or the components thereof, can include software and hardware designed to be integrated into standard catheterization procedures and automatically acquire both extravascular imaging data (e.g. angiography/fluoroscopy) and intravascular imaging data (e.g. IVUS or OCT) through image or video acquisition.

The computer system/sub-system 130, or the components thereof, can include software or hardware that is configured to execute a method for vascular imaging co-registration of the obtained extravascular imaging data and the obtained intravascular imaging data. In that context, the computer 130 may include computer readable instructions or software to execute the method for vascular imaging co-registration as disclosed herein. For example, in some respects the computer may include a processor or a memory which includes software including program code causing the computer to execute the method for vascular imaging co-registration as disclosed herein. For example, the computer/computing device can include a processor or memory including instructions executable by the processor to perform the method for vascular imaging co-registration as disclosed herein. In that context, it can also be appreciated that also disclosed herein is a computer readable medium having stored thereon in a non-transitory state a program code for use by the computer/computing device 130, the program code causing the computing device 130 to execute the method for vascular imaging co-registration as disclosed herein. Additionally, the computer/computing device 130 may be part of or include a system for intravascular imaging registration that includes one or more input port for receiving imaging data; one or more output port; and a controller in communication with the input port and the output port, the controller configured to execute the method for intravascular imaging registration as disclosed herein.

The computer system/sub-system 130 can also include software and hardware that is configured for rendering or displaying imaging, including, for example, extravascular imaging or intravascular imaging derived from the received image data or co-registration method. In some cases, the computer 130 or software can be configured to render both extravascular imaging and intravascular imaging on a single display. In that regard, the system may include a display 150 configured for simultaneously displaying extravascular image data and intravascular image data rendered by the computer 130. The display 150 may be part of the computer system 130 or may be a separate component in communication with the computer system 130, for example through an output port on the computer 130 and a transmission cable 121. In some other cases, however, the communication through the output port may be wireless, rather than by cable. In some examples, the computer 130 or display 150 may be configured to simultaneously provide an angiogram, an IVUS transverse plane view, and an IVUS longitudinal plane view, which may or may not all be co-registered. In other examples, the display may be configured to simultaneously provide an angiogram, an OCT transverse plane view, and an OCT longitudinal plane view, which may or may not be co-registered.

The computer system/sub-system 130 can also include one or more additional output ports for transferring data to other devices. For example, the computer can include an output port to transfer data to a data archive or memory 131. The computer system/sub-system 130 can also include a user interface that may include software and hardware that is configured for allowing an operator to use or interact with the system.

The components of the system 102 may be used cooperatively during a vascular imaging method or procedure that involves the collection of extravascular imaging data and intravascular imaging data during a translation procedure. In the context of performing such a procedure, and obtaining the requisite imaging data, an example method for intravascular imaging registration may be executed or performed.

For example, the patient 100 may be arranged on the table 110 for extravascular imaging of a portion of a blood vessel of interest. The patient 100 or the table may be arranged or adjusted to provide for the desired view of the vessel of interest, in preparation for the collection of extravascular imaging data. Additionally, the intravascular imaging catheter 120 may be introduced intravascularly into the portion of the blood vessel of interest, in preparation for a translation procedure to collect intravascular imaging data. The intravascular imaging catheter 120 can be navigated, and positioned (often under fluoroscopy) within the vessel such that the imaging element is located at a desired starting location for the translation procedure. A guide catheter may be used to aid in navigation. Once in the proper position, a translation procedure may be executed or performed. Before or during the translation procedure, requisite extravascular and intravascular imaging data may be obtained. In this context, or as part of this process, an example method for vascular imaging co-registration or registration may be executed or performed.

Additional details regarding co-registering intravascular imaging data with extravascular imaging data may be found in U.S. Ser. No. 63/157,427, filed Mar. 5, 2021, which application is incorporated by reference herein in its entirety.

In some cases, the hemodynamic data may include pressure data. As an example, FFR (fractional flow reserve) data may be obtained that compares pressure measured in the aorta with pressure measured elsewhere, such as in the coronary arteries. If there are no blockages or anything else impeding blood flow through the coronary arteries, then the pressure measured within the coronary arteries would be expected to be the same as that measured in the aorta. The FFR can be considered as being a fraction of the two pressure values. If the fraction is below one (1), this means that the pressure within the coronary artery currently being tested is lower than the aortic pressure. This can indicate a blockage or other impediment to blood flow within that particular coronary artery. In some cases, hemodynamic data such as FFR (fractional flow reserve) data may be co-registered with extravascular imaging data such as angiographic data. Intravascular imaging data such as IVUS (intravascular ultrasound) may be co-registered with the same extravascular imaging data in order to obtain both hemodynamic and intravascular imaging data for each location of interest within the extravascular imaging data.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The invention's scope is, of course, defined in the language in which the appended claims are expressed.

What is claimed is:

1. A method for estimating patient hemodynamic data, the method comprising:
   training a neural network, where training the neural network comprises:
   providing a plurality of extravascular imaging data sets to the neural network;
   providing a plurality of intravascular ultrasound imaging data sets to the neural network, each of the plurality of intravascular ultrasound imaging data sets including intravascular ultrasound imaging data showing a portion of a blood vessel from a starting location to an ending location, each of the plurality of intravascular ultrasound imaging data sets co-registered to a corresponding extravascular imaging data set of the plurality of extravascular imaging data sets;
   providing a plurality of hemodynamic data sets to the neural network, each of the plurality of hemodynamic data sets co-registered with the corresponding extravascular imaging data set of the plurality of extravascular imaging data sets;
   the neural network using the provided plurality of intravascular ultrasound imaging data sets and the provided plurality of hemodynamic data sets, each co-registered with the corresponding extravascular imaging data set to learn what hemodynamic data to expect for a given intravascular ultrasound imaging data set, thereby creating a trained neural network;

using the trained neural network with a subsequent patient, comprising:

performing an intravascular ultrasound imaging event in which an intravascular ultrasound imaging element is translated within a blood vessel of the subsequent patient from a starting location to an ending location in order to produce one or more intravascular ultrasound images;

the trained neural network using its training to predict hemodynamic values corresponding to the one or more intravascular images from the intravascular imaging event; and outputting the one or more intravascular ultrasound images in combination with the predicted hemodynamic values.

2. The method of claim 1, wherein at least some of the plurality of extravascular imaging data sets provided while training the neural network comprise fluoroscopic image data or angiographic image data.

3. The method of claim 1, wherein at least some of the plurality of hemodynamic data sets provided while training the neural network comprise pressure data obtained by any hyperemic or non-hyperemic index.

4. The method of claim 1, wherein at least some of the plurality of intravascular ultrasound imaging data sets and at least some of the plurality of hemodynamic data sets are co-registered using their corresponding points in 2D or 3D space on the corresponding extravascular imaging data set.

5. The method of claim 1, wherein the neural network comprises one or more of an ensemble of neural networks, a CNN (convoluted neural network) with transformers or a multi-layer neural network.

6. The method of claim 1, wherein at least some of the plurality of intravascular ultrasound imaging data sets provided while training the neural network include quantitative data including one or more of lumen borders, vessel borders, side-branch borders, blood speckle density and cardiac cycle parameters; and the quantitative data is used in training the neural network.

7. The method of claim 1, wherein:

the one or more intravascular ultrasound images from the intravascular ultrasound imaging event include an anatomical landmark; and the predicted hemodynamic values include a predicted pressure value proximate the anatomical landmark.

8. The method of claim 1, wherein outputting the one or more intravascular ultrasound images in combination with the predicted hemodynamic values comprises displaying the one or more intravascular ultrasound images and the predicted hemodynamic values on a graphical user interface of a signal processing unit.

9. The method of claim 8, wherein displaying the one or more intravascular ultrasound images and the predicted hemodynamic values on the graphical user interface of the signal processing unit comprises displaying a fully co-registered display of the predicted hemodynamic values with the one or more intravascular ultrasound images.

10. A method for processing imaging data, the method comprising:

providing a plurality of intravascular ultrasound imaging data sets to a neural network, wherein each of the plurality of intravascular ultrasound imaging data sets include intravascular ultrasound imaging data showing a portion of a blood vessel, co-registered to an extravascular image from a corresponding extravascular imaging data set, from a starting location to an ending location;

providing a plurality of hemodynamic data sets to the neural network, wherein each of the plurality of hemodynamic data sets include hemodynamic data from a corresponding portion of the blood vessel, co-registered to a corresponding extravascular image from the corresponding extravascular imaging data set, from the starting location to the ending location, as represented by one of the plurality of intravascular imaging data sets;

the neural network using the provided intravascular ultrasound imaging data sets and the plurality of hemodynamic data sets, from co-registration of each of the plurality of intravascular ultrasound data sets and each of the plurality of hemodynamic data sets to the corresponding extravascular image, to learn what hemodynamic data to expect for a given intravascular ultrasound imaging data set, thereby training the neural network;

performing in a new patient an intravascular ultrasound imaging event in which an imaging element is translated within a blood vessel from a starting location to an ending location in order to produce one or more intravascular images;

the neural network using its training to predict hemodynamic values corresponding to the one or more intravascular ultrasound images from the intravascular ultrasound imaging event; and outputting the one or more intravascular ultrasound images in combination with the predicted hemodynamic values.

11. The method of claim 10, wherein the corresponding extravascular imaging data set comprises fluoroscopic image data or angiographic image data.

12. The method of claim 10, wherein at least some of the plurality of hemodynamic data sets comprise pressure data obtained by any hyperemic or non-hyperemic index.

* * * * *